(12) United States Patent
Muramatsu et al.

(10) Patent No.: US 8,471,945 B2
(45) Date of Patent: Jun. 25, 2013

(54) IMAGE DISPLAY DEVICE AND IMAGING DEVICE

(75) Inventors: Fumio Muramatsu, Kyoto (JP); Masato Murayama, Osaka (JP)

(73) Assignee: Panasonic Corporation, Osaka (JP)

( * ) Notice: Subject to any disclaimer, the term of this patent is extended or adjusted under 35 U.S.C. 154(b) by 446 days.

(21) Appl. No.: 12/919,764

(22) PCT Filed: Mar. 16, 2009

(86) PCT No.: PCT/JP2009/001157
§ 371 (c)(1),
(2), (4) Date: Aug. 27, 2010

(87) PCT Pub. No.: WO2009/116260
PCT Pub. Date: Sep. 24, 2009

(65) Prior Publication Data
US 2011/0043677 A1    Feb. 24, 2011

(30) Foreign Application Priority Data

Mar. 17, 2008 (JP) .................................. 2008-067506

(51) Int. Cl.
*H04N 5/225* (2006.01)
(52) U.S. Cl.
USPC ...................................................... 348/333.11
(58) Field of Classification Search
USPC ........................................ 348/333.01–333.13
See application file for complete search history.

(56) References Cited

U.S. PATENT DOCUMENTS

| | | | | |
|---|---|---|---|---|
| 7,466,357 | B2 * | 12/2008 | Myojo ....................... | 348/333.05 |
| 8,081,252 | B2 * | 12/2011 | Furuya et al. ............ | 348/333.12 |
| 2001/0012072 | A1 * | 8/2001 | Ueno ........................ | 348/333.02 |
| 2003/0076312 | A1 * | 4/2003 | Yokoyama ..................... | 345/204 |
| 2004/0175764 | A1 * | 9/2004 | Nishiyama et al. ............. | 435/7.2 |
| 2006/0146065 | A1 * | 7/2006 | Wada ............................. | 345/590 |
| 2007/0291154 | A1 * | 12/2007 | Moon et al. .............. | 348/333.05 |
| 2008/0303936 | A1 * | 12/2008 | Muramatsu et al. .......... | 348/335 |

FOREIGN PATENT DOCUMENTS

| | | | |
|---|---|---|---|
| JP | 2000-125153 | A | 4/2000 |
| JP | 2003-186461 | A | 7/2003 |
| JP | 2006-023686 | A | 1/2006 |
| JP | 2006-186751 | A | 7/2006 |
| JP | 2008-060918 | A | 3/2008 |

* cited by examiner

*Primary Examiner* — Aung S Moe
(74) *Attorney, Agent, or Firm* — Shinjyu Global IP

(57) ABSTRACT

There are provided an image display device and an imaging device with which efficiency can be improved in the comparison of a plurality of images. A digital camera includes a liquid crystal monitor, a body microcomputer, and an image display controller. The body microcomputer has a display manager and a selector. The liquid crystal monitor has a first display region and a second display region and is configured to display images recorded to a recording medium. The display manager is configured to manage as display objects one or more images that have yet to be displayed on the liquid crystal monitor in a specific mode. The selector is configured to select an image from among the display objects as a selected image for display on the liquid crystal monitor. The image display controller is configured to display the selected image in the first display region or the second display region.

14 Claims, 21 Drawing Sheets

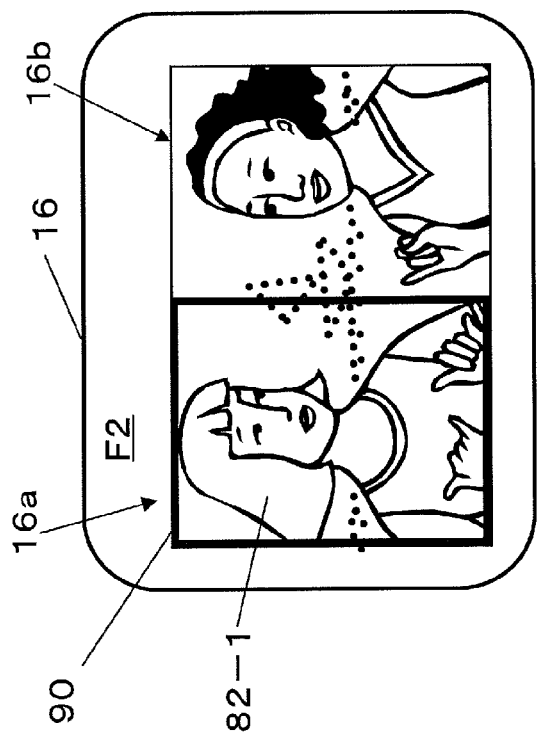
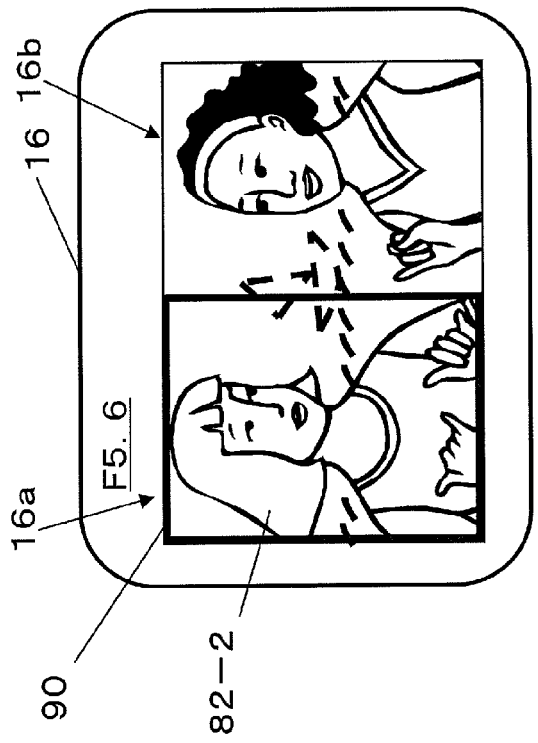
FIG. 12A
FIG. 12B

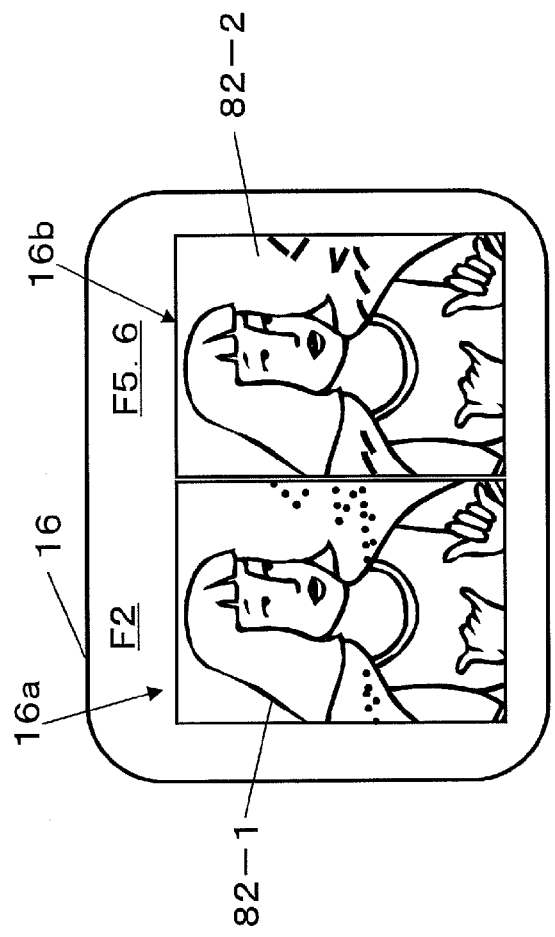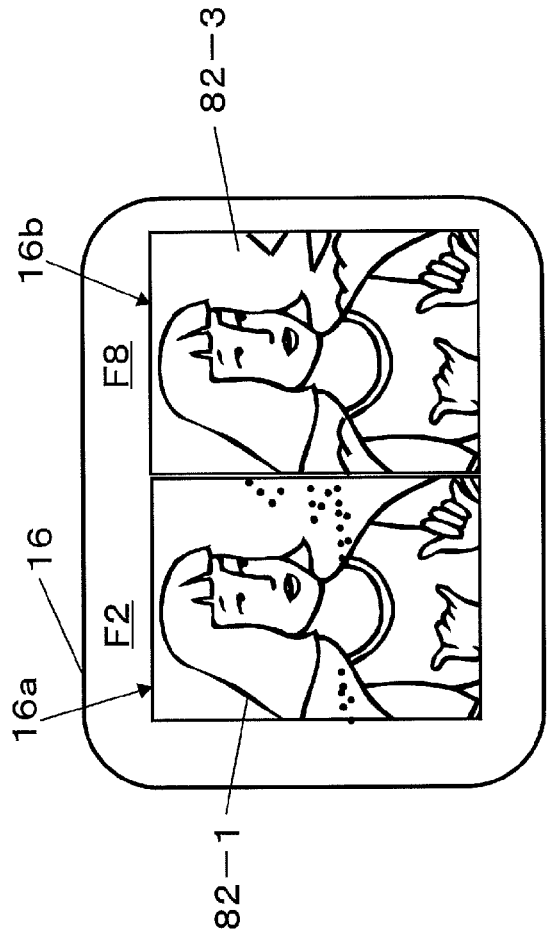
FIG. 13A
FIG. 13B

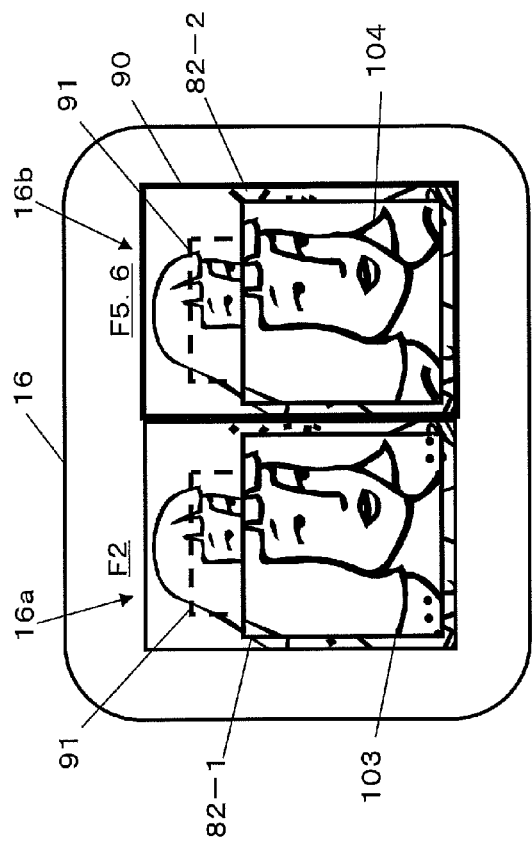
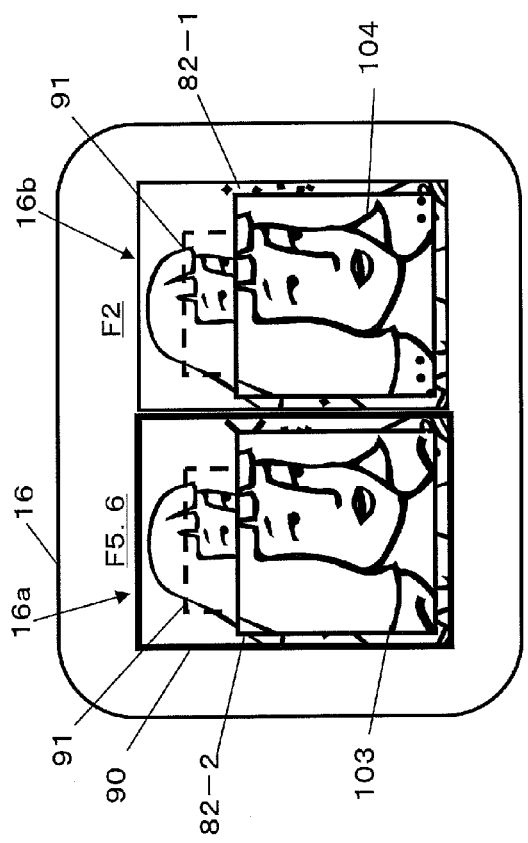
FIG. 16A
FIG. 16B

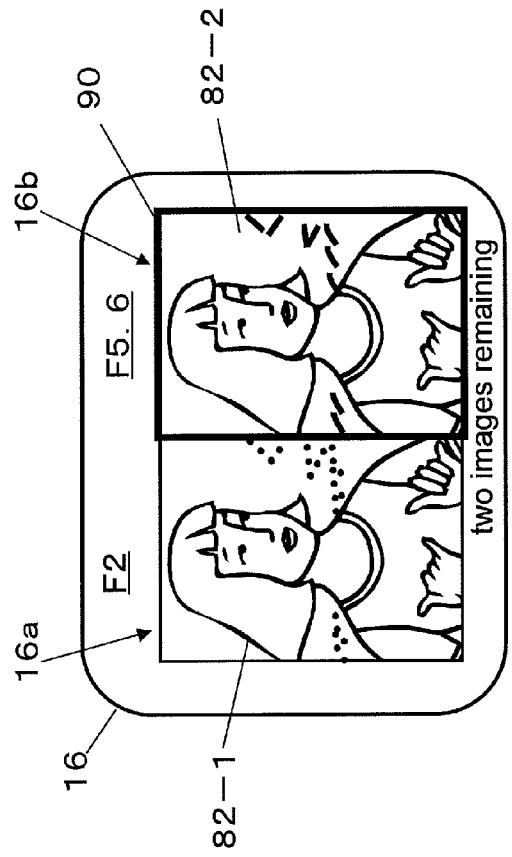 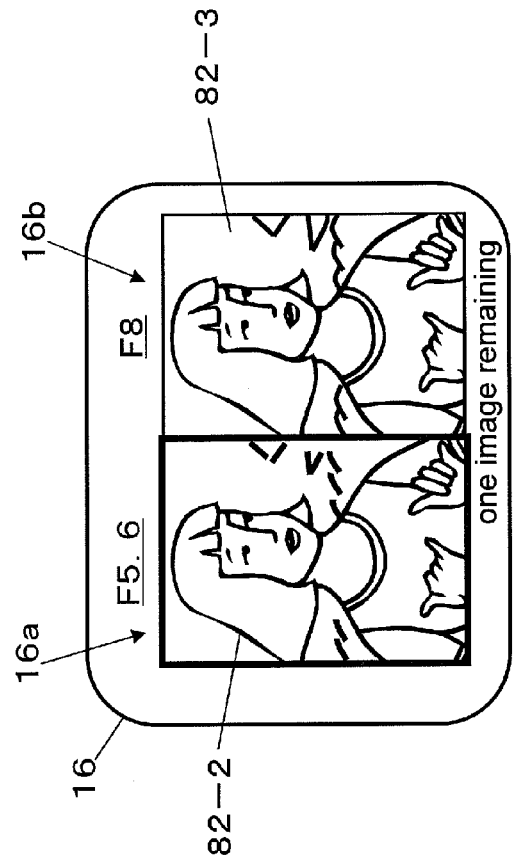
FIG. 19A
FIG. 19B

IMAGE DISPLAY DEVICE AND IMAGING DEVICE

CROSS-REFERENCE TO RELATED APPLICATIONS

This U.S. National stage application claims priority under 35 U.S.C. §119(a) to Japanese Patent Application No. 2008-067506 filed in Japan on Mar. 17, 2008, the entire contents of which are hereby incorporated herein by reference.

TECHNICAL FIELD

The technical field relates to an image display device and an imaging device with which a plurality of images can be displayed side by side.

BACKGROUND ART

Imaging devices capable of converting an optical image of a subject into an electrical image signal and outputting this signal have rapidly gained popularity in recent years. An example of such an imaging device is a digital still camera. One of the features of a digital still camera is that the user can capture an image while looking at an image display device (such as a liquid crystal monitor for image display), allowing the user to check the captured image right away.

The image captured with a digital still camera will vary with the imaging conditions. For instance, the subject field depth varies with the aperture value, and it is possible to vary with the blurring of the background of the subject, which is in focus. As a method for checking the change in a captured image, there has been proposed an imaging device with which an image signal captured with an open aperture and an image signal captured with a set aperture value are stored, part of one image is replaced with the other image, and this combination is displayed on a display device (see Patent Citation 1, for example).

Patent Citation 1: Japanese Laid-Open Patent Application 2000-125153
Patent Citation 2: Japanese Laid-Open Patent Application 2006-23686
Patent Citation 3: Japanese Laid-Open Patent Application 2003-186461

SUMMARY

However, with the camera discussed in the above-mentioned Patent Citation 1, it is impossible to successively compare three or more images and select a single image in an efficient manner.

In view of this, there has been proposed an image display device with which a plurality of images can be compared (see Patent Citations 2 and 3, for example). With these image display devices, a plurality of related images can be displayed side by side, which is convenient when the images are being compared.

However, when a plurality of images are compared side by side, it is difficult to ascertain whether or not the displayed images have already been compared, so it is conceivable that comparison will be redundantly performed on the same images. This redundancy lowers efficiency when a plurality of images are being compared.

It is an object of the present invention to provide an image display device and an imaging device with which efficiency can be improved in comparing a plurality of images.

An image display device according to a first aspect includes a recorder, a display unit, a display manager, a selector, and an image display controller. The recorder records a plurality of images. The display unit has a first display region and a second display region and is configured to display images recorded by the recorder. The display manager is configured to manage as a display object at least one image that has yet to be displayed on the display unit in a specific mode, out of the plurality of images recorded to the recorder. The selector is configured to select an image to be displayed as a selected image on the display unit from the display object. The image display controller is configured to display the selected image in the first display region or the second display region.

With this image display device, the display manager manages as a display object at least one image that has yet to be displayed on the display unit in a specific mode, out of the plurality of images recorded to the recorder. The image to be displayed on the display unit is selected as the selected image by the selector from the display object, and the selected image is displayed by the image display controller in the first display region or the second display region. With this constitution, those images that have yet to be displayed on the display unit can be displayed, without the images that have already been displayed being displayed again. This eliminates redundancy in which the same images are compared more than once, and improves efficiency in the comparison of images.

The term "specific mode" as used here could be a mode in which management of the display object is required, such as a mode in which a plurality of images are displayed side by side for comparison. The phrase "manage the display object" means, for example, that undisplayed images are set to the display object, or images that have already been displayed are excluded from the display object, or images that have already been displayed are reset to the display object on the basis of some condition.

An imaging device according to a second aspect includes an optical system, an image acquisition section, and the image display device according to the first aspect. The optical system is configured to form an optical image of a subject. The image acquisition section is configured to convert the optical image into an image signal, and is configured to acquire an image of the subject. The image display device is configured to display the image acquired by the image acquisition section.

Since this imaging device is equipped with the image display device according to the first aspect, efficiency can be improved in the comparison of images.

Examples of image display devices here include a compact digital camera, an interchangeable lens digital camera, a digital video camera, and other such devices with which images can be displayed. Examples of imaging devices include a compact digital camera, an interchangeable lens digital camera, a digital video camera, and other such devices capable of capturing only still pictures, devices capable of capturing only moving pictures, and devices capable of capturing both still pictures and moving pictures.

BRIEF DESCRIPTION OF DRAWINGS

FIGS. 12A and 12B are display examples of when selecting a reference image;

FIGS. 13A and 13B are display examples of when selecting a comparative image;

FIGS. 16A and 16B are display examples of when changing the comparative image in the course of image selection;

FIGS. 19A and 19B are display examples of the image comparison and selection mode;

DETAILED DESCRIPTION OF THE EMBODIMENTS

1: Overall Configuration of Camera System 1.1 Overall Configuration

Figure 1:
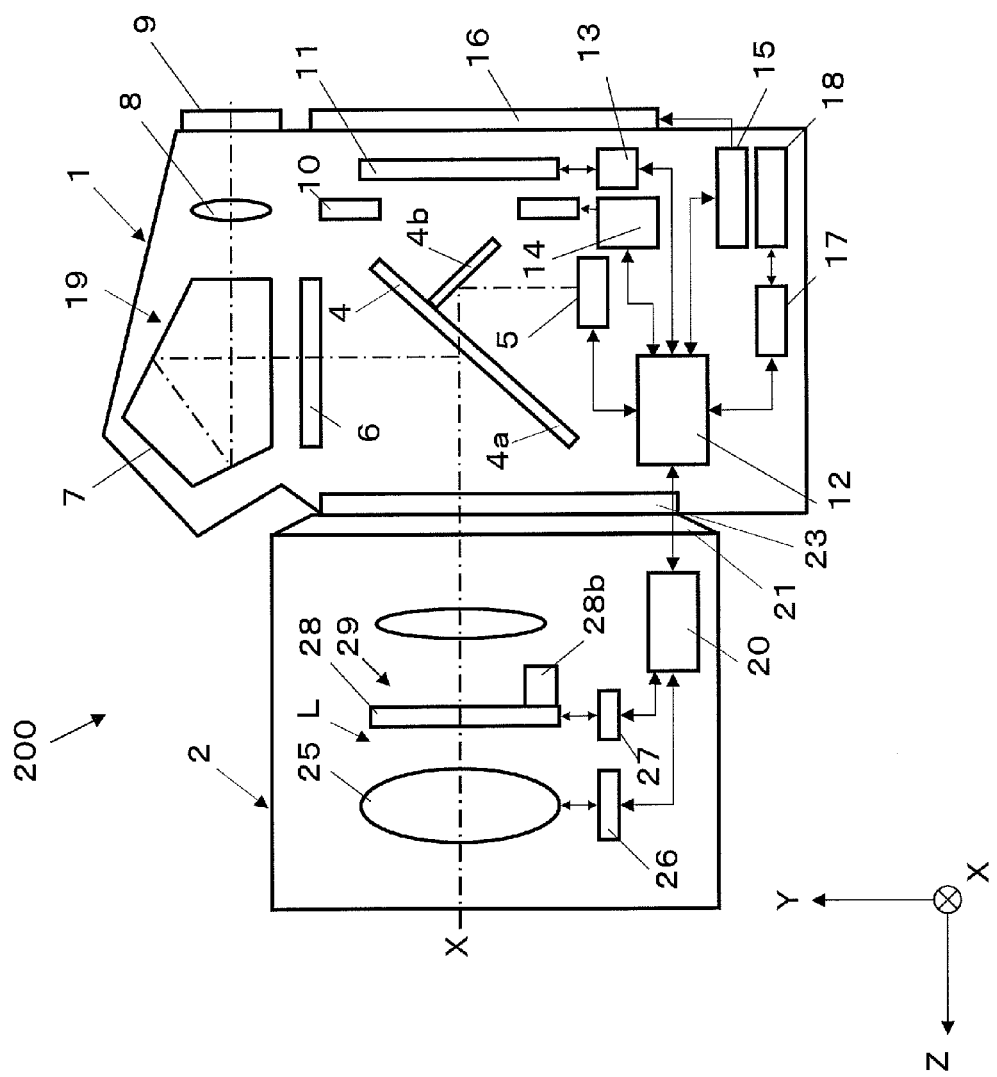
FIG. 1 is a diagram of the overall configuration of a digital camera.

The digital camera 200 according to this embodiment will be described. FIG. 1 is a diagram of the overall configuration of the digital camera 200.

The digital camera 200 (an example of an imaging device) shown in FIG. 1 is an interchangeable lens type of digital single lens reflex camera, and includes a camera body 1 and an interchangeable lens unit 2.

The camera body 1 and the interchangeable lens unit 2 exchange various control signals via an electrical contact (not shown) of a lens mount 21 of the interchangeable lens unit 2 and an electrical contact (not shown) of a body mount 23 of the camera body 1.

1.2: Configuration of Interchangeable Lens Unit

The interchangeable lens unit 2 has the lens mount 21, and is removably mounted to the body mount 23 provided to the front face of the camera body 1, via the lens mount 21.

The interchangeable lens unit 2 mainly comprises an optical system L for forming a subject image on an imaging sensor 11 of the digital camera 200 (discussed below), an aperture setting section 29 for adjusting the aperture of the optical system L, and a lens microcomputer 20 for controlling various sequences of the interchangeable lens unit 2.

The optical system L has a focus lens group (not shown) and an aperture unit 28. A focus controller 26 for controlling the drive of the focus lens group 25 is mounted inside the interchangeable lens unit 2.

The aperture setting section 29 mainly has an aperture ring 40 which the user can turn to input aperture values, an aperture linear sensor (not shown) for outputting a physical quantity corresponding to the rotational angle of the aperture ring 40, a diaphragm drive motor 28b for driving diaphragm blades of the aperture unit 28, and an aperture controller 27 for adjusting the aperture to be equal to the set aperture value.

The lens microcomputer 20 is a control device serving as the functional center of the interchangeable lens unit 2, is connected to various components mounted in the interchangeable lens unit 2, and controls various sequences of the interchangeable lens unit 2. For example, a CPU, a ROM, and a RAM (not shown) are installed in the lens microcomputer 20, and various functions can be realized by having the CPU read programs stored in the CPU. The lens microcomputer 20 outputs control signals and commands, for example, to the focus controller 26, the aperture controller 27, a shift controller (not shown), and so forth, and thereby executes control over the focus controller 26, the aperture controller 27, the shift controller (not shown), and so forth.

Also, the lens microcomputer 20 is connected via an interface with a body microcomputer 12, and communicates with this body microcomputer 12. The lens microcomputer 20 holds various kinds of lens information related to the interchangeable lens unit 2. The lens information is stored in a ROM, for example.

1.3: Configuration of Camera Body

The camera body 1 mainly has a quick return mirror 4 for varying the path taken by light from the subject, a viewfinder optical system 19 for viewing a subject image, a focus detection unit 5 for performing focus detection, a shutter unit 10 for opening and closing the shutter, an imaging unit for acquiring a subject image as a captured image, an image display unit for displaying a captured image, an imaging mode switching unit for switching between imaging modes, a depth-of-field reviewing mode setting section for setting to depth-of-field reviewing mode, a shutter controller 14 for controlling the shutter unit 10, an image recorder 18 for recording a captured image, and the body microcomputer 12 for controlling various sequences of the camera body 1.

The body microcomputer 12 that controls various sequences is installed in the camera body 1. An imaging sensor controller 13 controls the drive of the imaging sensor 11. The shutter controller 14 controls the drive of the shutter unit 10.

An image display controller 15 controls a liquid crystal monitor 16 so that a captured image is displayed on the liquid crystal monitor 16 after specific image processing has been performed on image data read from the imaging sensor 11. In the image comparison and selection mode (discussed below), the image display controller 15 displays the image selected by a selector 12b (discussed below) (an example of a selected image, and an example of an image scheduled to be displayed) in a first display region 16a or a second display region 16b of the liquid crystal monitor 16. Also, the image display controller 15 displays an image newly selected by the selector 12b in a different region from the region selected by a display operation unit 69, out of the first display region 16a and the second display region 16b. The image comparison and selection mode will be discussed in detail below.

The quick return mirror 4 mainly comprises a main mirror 4a that is capable of reflecting and transmitting incident light, and a sub-mirror 4b that is provided on the rear face side of the main mirror 4a and reflects transmitted light from the main mirror 4a, and can be flipped up outside the optical path X by a quick return mirror controller 60. This quick return mirror 4 is disposed so as to be movable between the position along the optical path X shown in FIG. 2 and the position outside the optical path X shown in FIG. 3.

The subject light that has passed through the interchangeable lens unit 2 is split into two light beams by the main mirror 4a. The reflected light beam is guided to the viewfinder optical system 19, while the transmitted light beam is reflected by the sub-mirror 4b and guided to the focus detection unit 5.

The viewfinder optical system 19 mainly has a viewfinder screen 6 where an image of the subject is formed, a pentaprism 7 for converting the subject image into an erect image, an eyepiece 8 for guiding the erect image of the subject to a viewfinder window 9, and the viewfinder window 9 through which the user can see the subject. The light beam reflected by the main mirror 4a forms an image on the viewfinder screen 6. The subject image formed on the viewfinder screen 6 can be observed through the viewfinder window 9 via the pentaprism 7 and the eyepiece 8.

The focus detection unit 5 is a unit for detecting whether or not an image formed by light from the subject is in a focused state (detecting focus) from the light reflected by the sub-mirror 4b, and for example performs focus detection by a standard phase difference detection method.

The imaging unit mainly has the imaging sensor 11 and the imaging sensor controller 13, and acquires the subject image as a captured image. The imaging unit converts the subject image produced by incident light (an optical image of the subject) into an electrical signal for forming a captured image.

The display unit comprises the liquid crystal monitor 16 (an example of a monitor) and the image display controller 15 that controls the operation of the liquid crystal monitor 16. The liquid crystal monitor 16 has a display region including the first display region 16a and the second display region 16b, and displays a captured image acquired by the imaging unit (or, an image recorded to a recording medium) in an image display region 100. The liquid crystal monitor 16 is an example of a monitor for displaying images, and may be, for example, an organic electroluminescence device, an inorganic electroluminescence device, a plasma display panel, or the like.

The image recorder 18 records captured images to an internal memory, a removable memory, or another such recording medium (not shown), and reads captured images from the recording medium. A removable memory can be removably mounted to the image recorder 18. The recording and reading performed by the image recorder 18 are controlled by an image recording controller 17. The image recorder 18 and the recording medium form a recorder for recording a plurality of images.

The removable memory is able to store image data that has or has not undergone specific processing. It is also able to store digitized audio signals and the like.

The body microcomputer 12 is a control device serving as the functional center of the camera body 1, and controls various sequences. The body microcomputer 12 is equipped with a CPU, ROM, and RAM, for example, and the body microcomputer 12 can perform many different functions when programs held in the ROM are read by the CPU.

The body microcomputer 12 has the functions of a display manager 12a, a selector 12b, and a setting section 12c, for example. More specifically, the display manager 12a manages as the display object any images that have yet to be displayed on the liquid crystal monitor 16 in image comparison and selection mode (an example of a specific mode), out of the plurality of images recorded to the image recorder 18. More specifically, the display manager 12a stores the file name of images managed as the display object as identification information, for example. Also, the display manager 12a deletes the file name of images displayed on the liquid crystal monitor 16 from the memory region, and thereby eliminates those images displayed on the liquid crystal monitor 16 in the image comparison and selection mode from the display object. That is, the file names stored in the display manager 12a indicate images that have not been displayed on the liquid crystal monitor 16 in the image comparison and selection mode, and the file names not stored in the display manager 12a indicate images that have already been displayed on the liquid crystal monitor 16 in the image comparison and selection mode.

The phrase "management of the display object" as used above means, for example, setting an image that has not been displayed to be the display object, or eliminating an image that has already been displayed from the display object.

The selector 12b selects as a selected image an image displayed on the liquid crystal monitor 16 from the display object managed by the display manager 12a. If there are a plurality of images as the display object, the selector 12b selects an image from the display object on the basis of imaging conditions recorded along with the images. In this embodiment, the selector 12b selects from the display object the image with the lowest aperture value. The image comparison and selection mode in which the processing of the display manager 12a and the selector 12b is carried out will be discussed below.

In comparison reproduction mode and image comparison and selection mode, the setting section 12c sets two of the plurality of images recorded to the image recorder 18 to be a reference image and a comparative image, as images displayed in the first display region 16a and the second display region 16b. For example, the image selected by the user with the display operation unit 69 is set to be the reference image, and the image selected by the selector 12b is set to be the comparative image.

The body microcomputer 12 outputs control signals and commands, for example, to the shutter controller 14, the imaging sensor controller 13, the image display controller 15, the image recording controller 17, etc., and thereby executes control over the shutter controller 14, the imaging sensor controller 13, the image display controller 15, the image recording controller 17, etc. Also, the body microcomputer 12 is connected via an interface with the lens microcomputer 20, and communicates with this lens microcomputer 20.

1.4: Viewfinder Imaging Mode and Monitor Imaging Mode

This digital camera 200 has a viewfinder imaging mode and a monitor imaging mode as its imaging modes. The viewfinder imaging mode is a mode in which the user looks through the viewfinder eyepiece window 9 to see the subject, and is the ordinary imaging mode for a conventional single-lens reflex camera.

Figure 2:
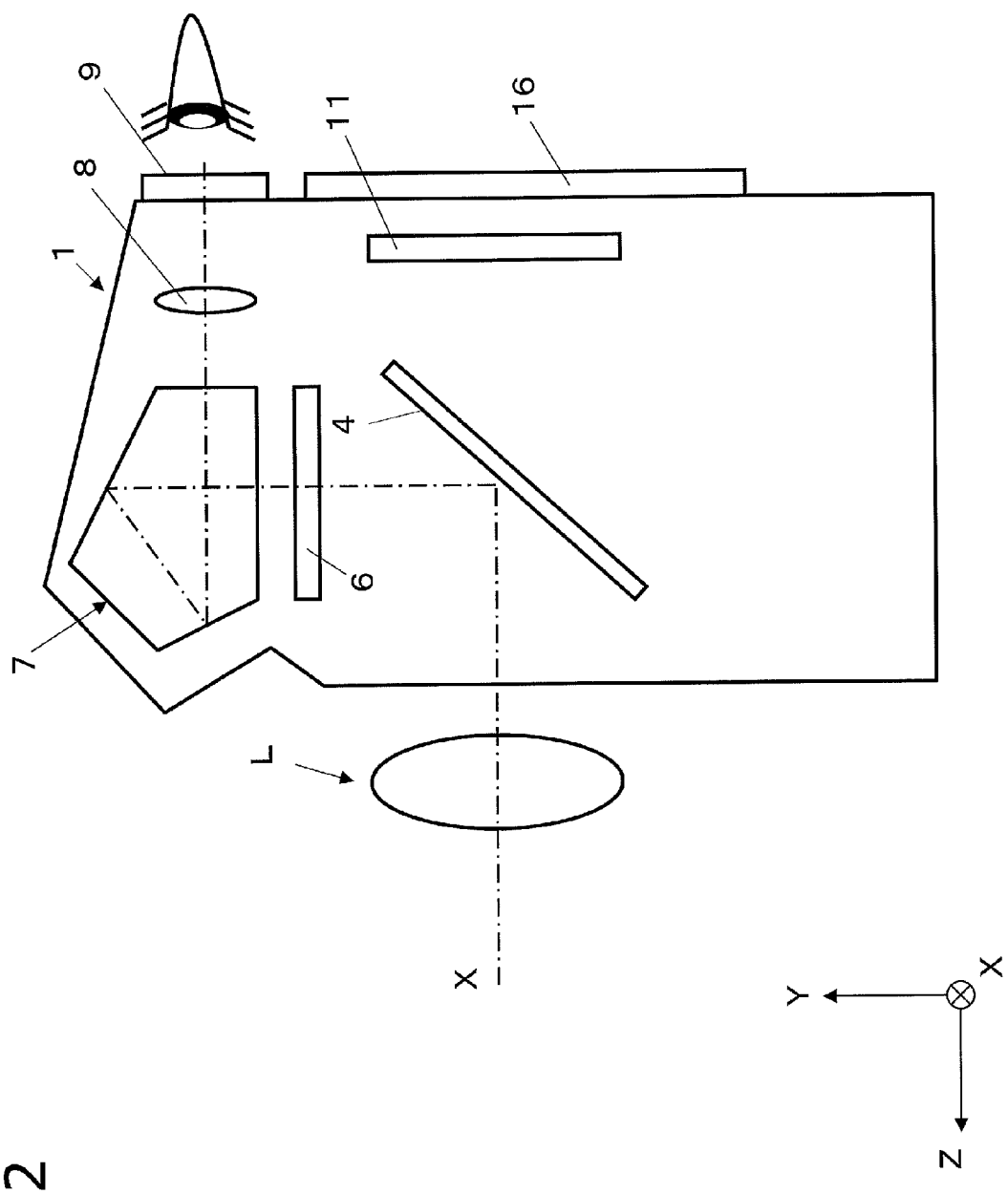
FIG. 2 is a simplified diagram illustrating a viewfinder imaging mode.

In this viewfinder imaging mode, as shown in FIG. 2, the quick return mirror 4 is disposed at a specific location in the optical path X, and subject light is guided to the viewfinder optical system 19, so the user can see the subject image through the viewfinder eyepiece window 9. During actual imaging, the quick return mirror 4 is flipped up outside the optical path X, and the shutter unit 10 is opened so that the subject image is formed on the imaging face of the imaging sensor 11.

Figure 3:
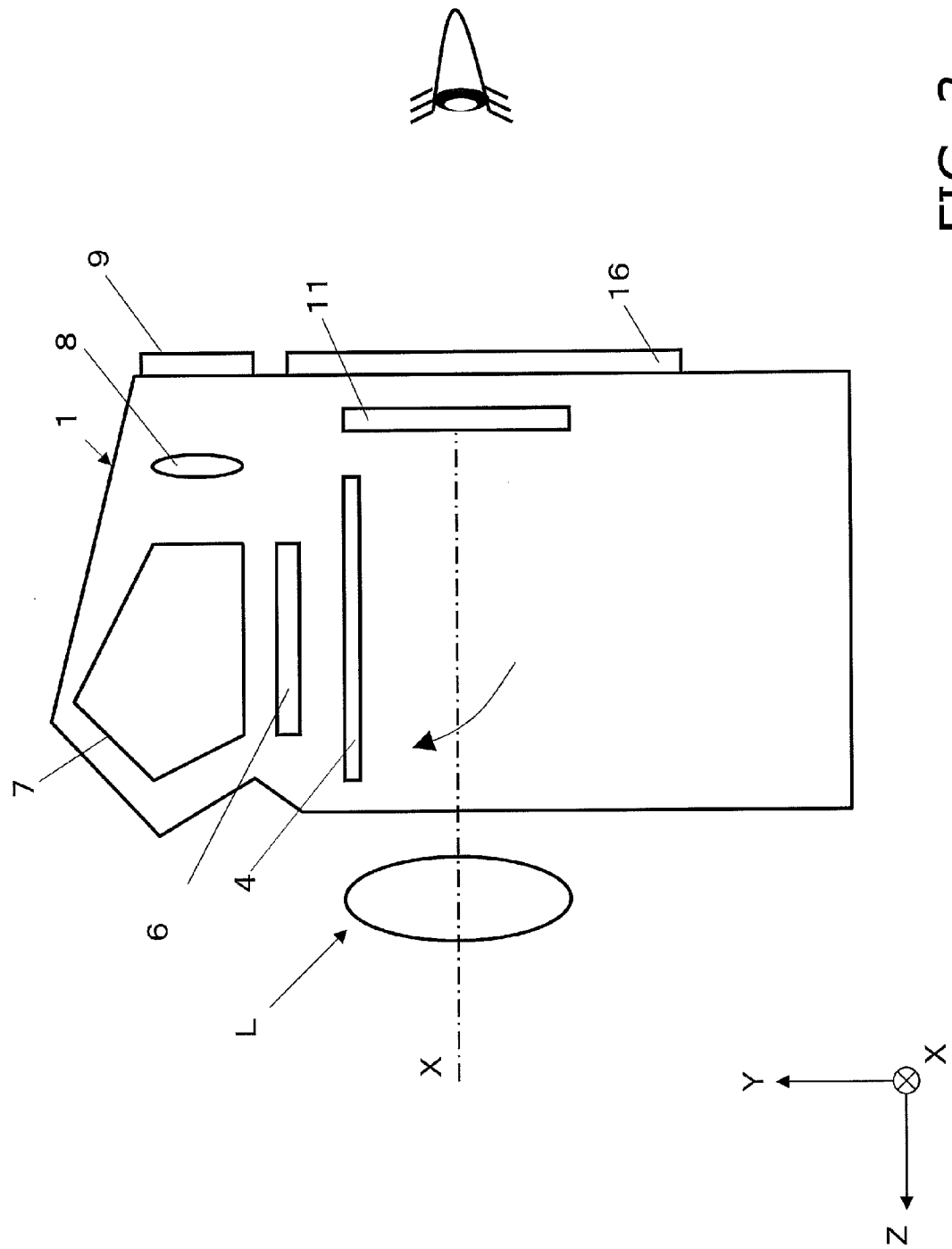
FIG. 3 is a simplified diagram illustrating a monitor imaging mode.

Meanwhile, the monitor imaging mode is a mode in which the user captures an image while looking at the subject displayed on the liquid crystal monitor 16. In the monitor imaging mode, as shown in FIG. 3, the quick return mirror 4 is retracted from the optical path X. An image of the subject is displayed on the liquid crystal monitor 16 via the imaging sensor 11.

1.5: Configuration of Top Face of Digital Camera

Figure 4:
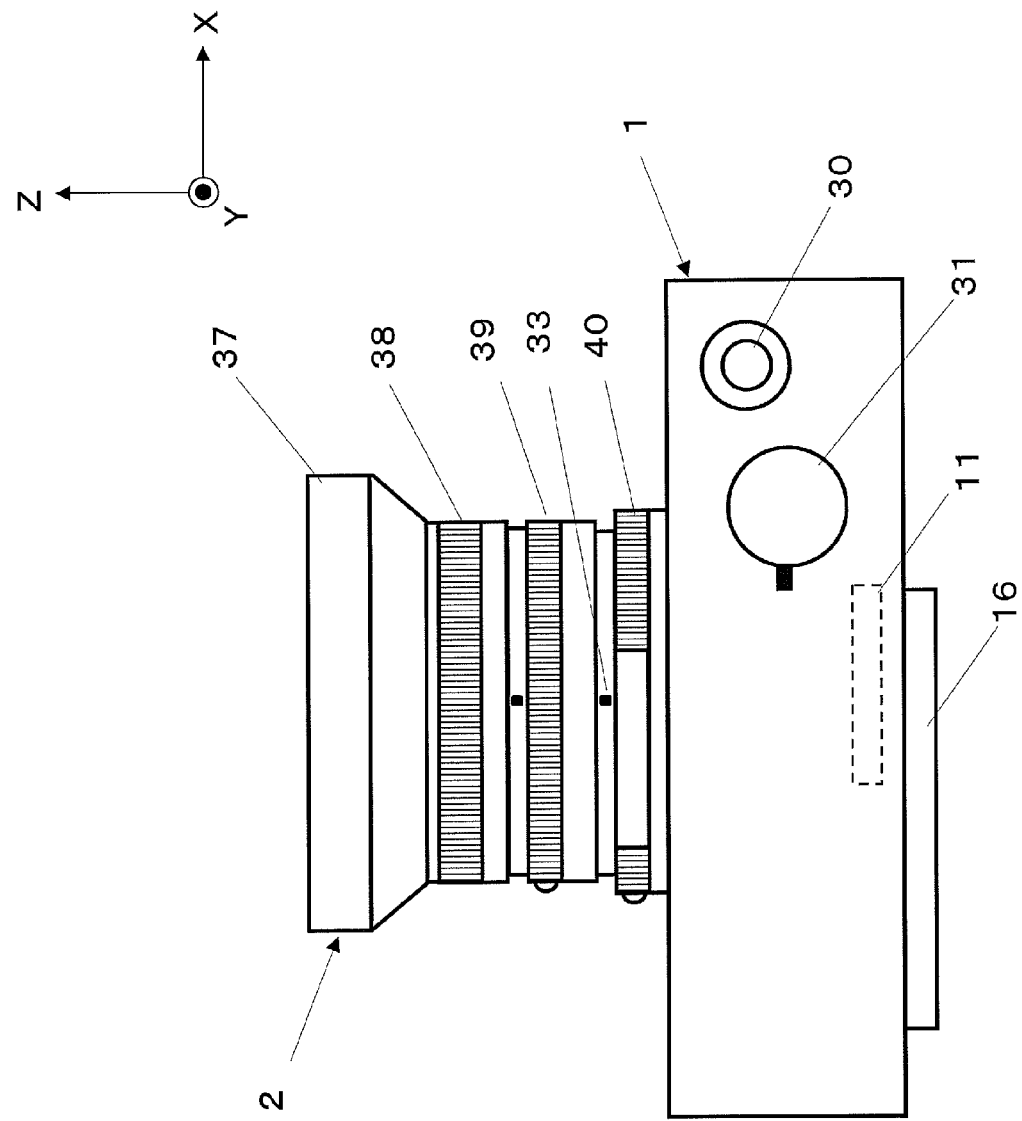
FIG. 4 is a top view of a digital camera.

FIG. 4 is a top view of the digital camera 200. The X, Y, and Z axes are defined as shown in FIG. 4. That is, the Z axis is defined as being parallel to the optical axis of the lens (not shown) constituting the optical system L, the Y axis is defined as being parallel to the long-side direction of a captured image, and the X axis is defined as being parallel to the short-side direction of a captured image.

The digital camera 200 has a housing that is held by the user when the subject is being imaged. This camera body 1 has a release button 30 and a shutter speed setting dial 31. The release button 30 and shutter speed setting dial 31 are controls used to set the shutter speed.

The camera body 1 also includes the liquid crystal monitor 16. The liquid crystal monitor 16 is provided on the side of the camera body 1 that faces the user. The operation of the liquid crystal monitor 16 will be described below.

The interchangeable lens unit 2 has a filter mount 37 on the side closest to the subject (the positive side in the Z axis direction). The interchangeable lens unit 2 has a zoom ring 38, a focus ring 39, and the aperture ring 40, in that order from the filter mount 37 toward the camera body 1 side (the negative direction of the Z axis). The zoom ring 38, focus ring 39, and aperture ring 40 are all cylindrical rotating control members, and are rotatably disposed around the outer peripheral face of the interchangeable lens unit 2.

The zoom ring 38 is a control member used for zooming. When the user turns the zoom ring 38, the digital camera 200 performs zooming, that is, the focal length of the optical system L is changed.

The focus ring 39 is a control member used for focus adjustment. When the user turns the focus ring 39, the digital camera 200 performs focus adjustment, that is, the object distance of the optical system L is changed.

The aperture ring 40 is a control member used to set the aperture value. When the user turns the aperture ring 40, the digital camera 200 adjusts the aperture to the set aperture value.

1.6: Configuration of Rear Face of Digital Camera

Figure 5:
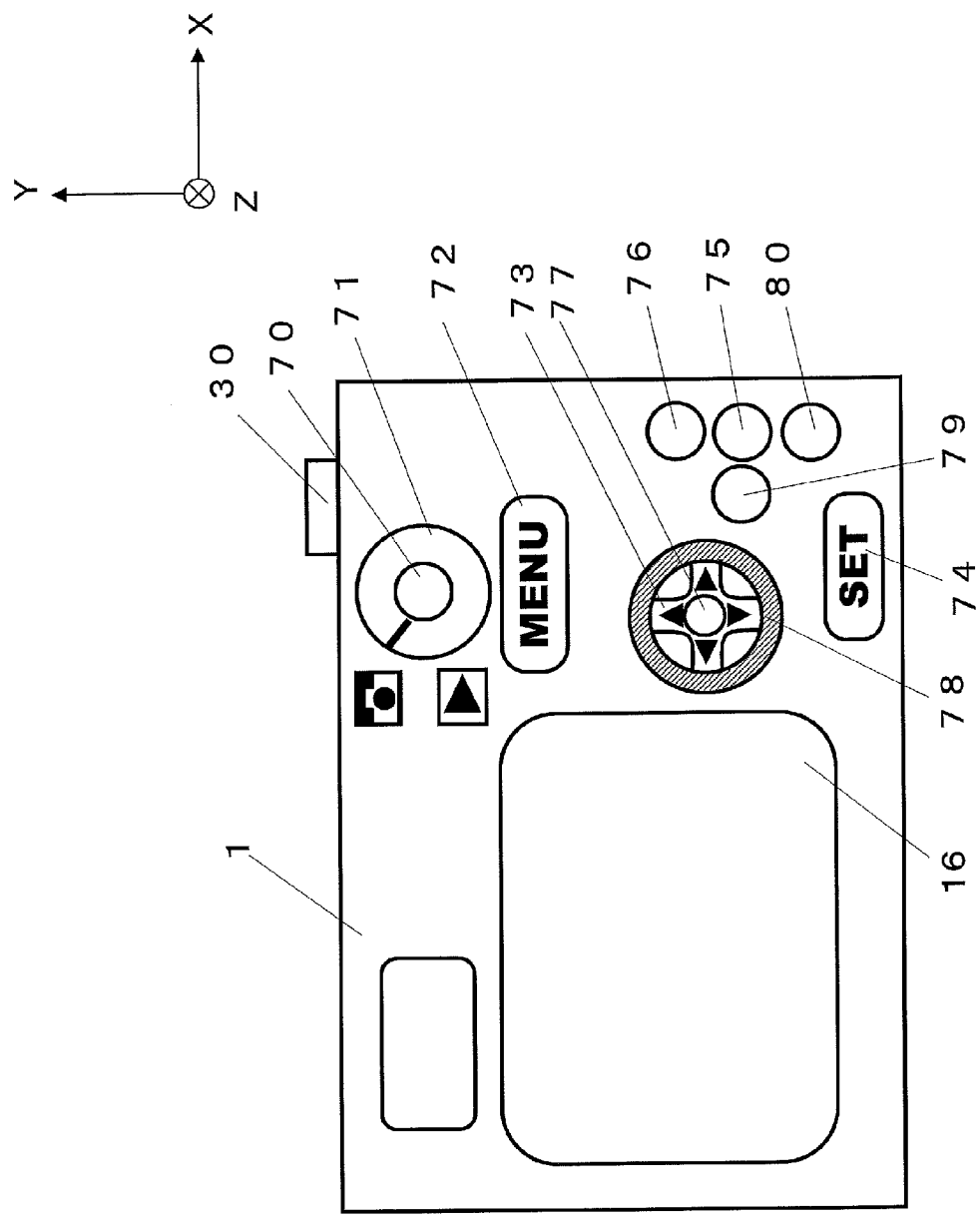
FIG. 5 is a rear view of a digital camera.

FIG. 5 is a rear view of the digital camera 200 according to this embodiment. The camera body 1 has a power button 70, an imaging/reproduction mode switching lever 71, a menu button 72, a directional arrow key 73, a set button 74, a depth-of-field reviewing button 76, an image mode switching button 75, and an enlargement mode button 79.

The power button 70 is a control member used to switch the power on and off to the digital camera 200.

The imaging/reproduction mode switching lever 71 is a control member that is used to switch between an imaging mode and a reproduction mode by switching a lever. The imaging mode referred to here is a mode that is set to capture a new subject image and create an image signal with the digital camera 200. The reproduction mode is a mode that is set to display an image signal already captured and stored in the digital camera 200.

The menu button 72 is a control member that is used to display various operation menus on the liquid crystal monitor 16. The directional arrow key 73 has up, down, left, and right arrow keys, and is a control member that is used to select display categories from various operation menus. A display operation unit 69 (an example of a first operation section) comprising the directional arrow key 73 and a confirmation button 77 is used in selecting an image displayed on the liquid crystal monitor 16 for some particular purpose. The directional arrow key 73 and the confirmation button 77 are operated by the user. More precisely, the body microcomputer 12 detects how the directional arrow key 73 and the confirmation button 77 are operated. The image the user wants to select from among the plurality of images displayed on the display unit is selected with the directional arrow key 73, and the confirmation button 77 is pressed to make the final confirmation of the image selected by the user. In the image comparison and selection mode (discussed below), one of the two images displayed in the first display region 16a and the second display region 16b can be selected with the display operation unit 69. The information inputted with the directional arrow key 73 and the confirmation button 77 is an example of first operation information for selecting one of the two images displayed in the first display region 16a and the second display region 16b (or one of the first display region 16a and the second display region 16b).

The set button 74 is a control member that is used to confirm the display categories on various operation menus. The image selector includes the directional arrow key 73 or a dial 78, and when the image selector is operated in the comparison reproduction mode, the image displayed in the second display region 16b of the liquid crystal monitor 16 is changed to another image out of the series of images.

The image mode switching button 75 is a control member that is used to switch between the viewfinder imaging mode and the monitor imaging mode. When the image mode switching button 75 is pressed in the viewfinder imaging mode, the mode is switched to the monitor imaging mode, and when the image mode switching button 75 is pressed in the monitor imaging mode, the mode is switched to the viewfinder imaging mode.

The depth-of-field reviewing button 76 is a button for changing to a depth-of-field reviewing mode (discussed below). With the digital camera 200, the user presses this depth-of-field reviewing button 76 to change to depth-of-field reviewing mode.

Also, an image comparison and selection mode button 80 is provided to the rear face of the camera body 1. The image comparison and selection mode button 80 is a button for switching to the image comparison and selection mode, in which a plurality of images are compared and the optimal image is selected. When the image comparison and selection mode button 80 is pressed, the body microcomputer 12 starts the image comparison and selection mode. If the image comparison and selection mode button 80 is pressed again, that ends the image comparison and selection mode.

1.7: Control System for Camera Body

Figure 6:
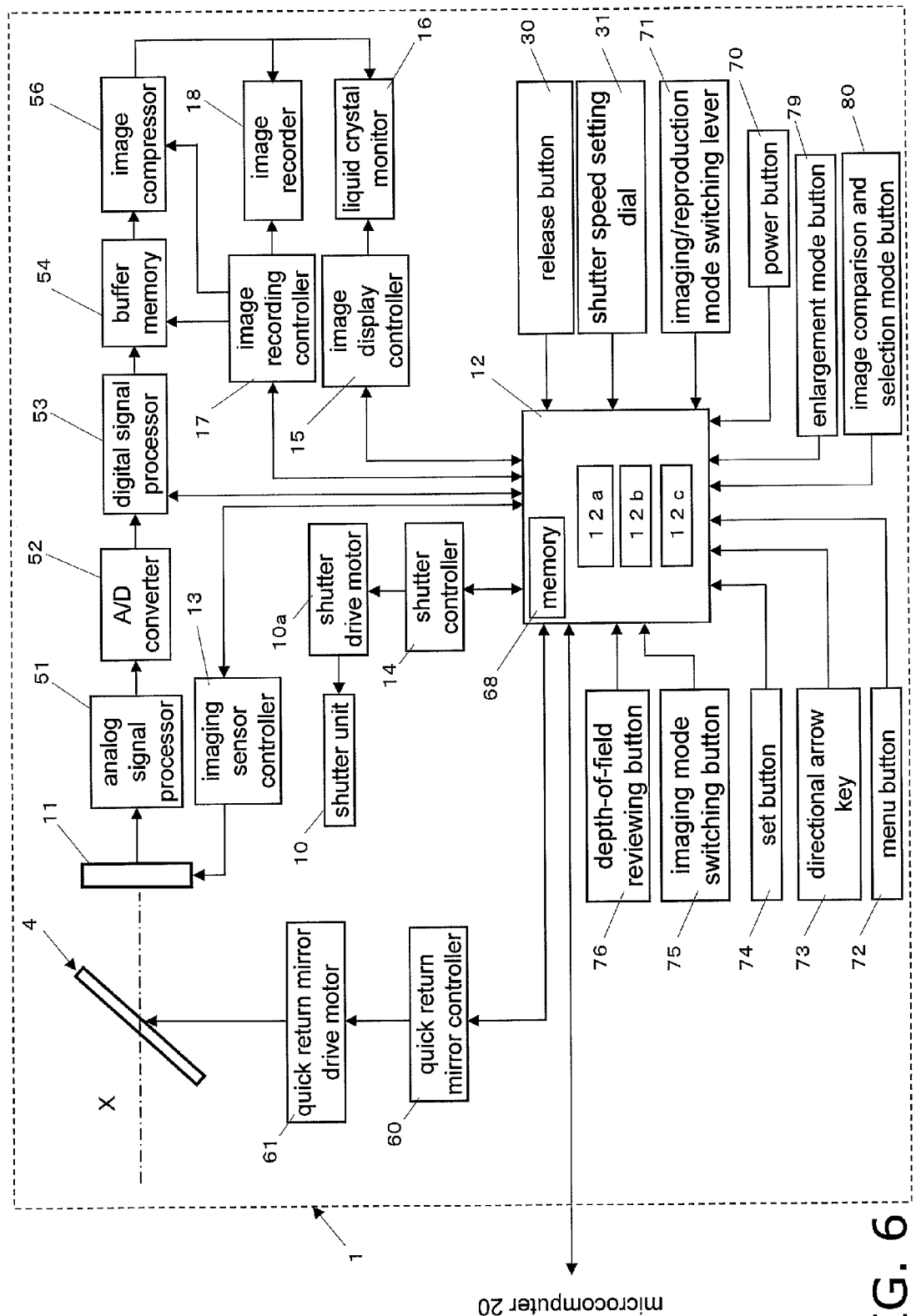
FIG. 6 is a block diagram of the control system of a camera body.

FIG. 6 is a block diagram of the control system of the camera body 1.

The body microcomputer 12 can receive signals from the release button 30, the shutter speed setting dial 31, the imaging/reproduction mode switching lever 71, the menu button 72, the directional arrow key 73, the set button 74, a imaging mode switching button 75, the depth-of-field reviewing button 76, and the enlargement mode button 79. Also, the body microcomputer 12 can send signals to the shutter controller 14 and the quick return mirror controller 60. Furthermore, the body microcomputer 12 can perform bidirectional communication between the body microcomputer 12 and the image recording controller 17, bidirectional communication between the body microcomputer 12 and the image display controller 15, and bidirectional communication between the body microcomputer 12 and a digital signal processor 53. The body microcomputer 12 also has a memory 68 for storing signals.

The shutter controller 14 drives a shutter drive motor 10a on the basis of a control signal from the body microcomputer 12. The quick return mirror controller 60 drives a quick return mirror drive motor 61 on the basis of a control signal from the body microcomputer 12.

The release button 30 sends information indicating shutter timing to the body microcomputer 12. The shutter speed setting section 31 sends set shutter speed information and shutter mode information.

The imaging sensor 11 is constituted by a CCD (charge coupled device), a CMOS (complementary metal oxide semiconductor), or another such opto-electric conversion element. The imaging sensor 11 converts an optical image formed by the optical system L of the interchangeable lens unit 2 into an electrical image signal. The drive of the imaging sensor 11 is controlled by the imaging sensor controller 13. The image signal outputted from the imaging sensor 11 is processed by an analog signal processor 51, an A/D converter 52, the digital signal processor 53, a buffer memory 54, and an image compressor 56, in that order.

As shown in FIG. 6, an image signal is sent from the imaging sensor 11 to the analog signal processor 51. The analog signal processor 51 subjects the image signal outputted by the imaging sensor 11 to analog signal processing, such as gamma processing. The image signal outputted from the analog signal processor 51 is sent to the A/D converter 52. The A/D converter 52 converts the analog image signal outputted from the analog signal processor 51 into a digital signal.

The image signal outputted from the A/D converter 52 is sent to the digital signal processor 53. The digital signal processor 53 subjects the image signal converted into a digital signal by the A/D converter 52 to digital signal processing, such as noise elimination or contour enhancement. The image signal outputted from the digital signal processor 53 is sent to the buffer memory 54. The buffer memory 54 temporarily stores the image signal processed by the digital signal processor 53. The buffer memory 54 is made up of a RAM (random access memory) or the like.

The image signal outputted from the buffer memory 54 is sent to the image compressor 56 according to a command from the image recording controller 17. The image compressor 56 subjects the image signal to compression processing according to a command from the image recording controller 17. The image signal is compressed to a data size that is smaller than that of the original data. The compression method can be, for example, JPEG (Joint Photographic Experts Group).

The compressed image signal is sent from the image compressor 56 to the image recorder 18 and the liquid crystal monitor 16. Meanwhile, the body microcomputer 12 sends a control signal to the image recording controller 17 and the image display controller 15. The image recording controller 17 controls the image recorder 18 on the basis of a control signal from the body microcomputer 12. The image display controller 15 controls the liquid crystal monitor 16 on the basis of a control signal from the body microcomputer 12.

The image recorder 18 records the image signal to an internal memory, removable memory, or other such recording medium on the basis of a command from the image recording controller 17. The image recorder 18 records information to be stored along with the image signal to a recording medium on the basis of a command from the image recording controller 17. The information to be stored along with the image signal includes the date and time the image was captured, focal length information, shutter speed information, aperture value information, and imaging mode information.

The liquid crystal monitor 16 displays the image signal as a visible image on the basis of a command from the image display controller 15. The liquid crystal monitor 16 displays various kinds of information along with the image signal on the basis of a command from the image display controller 15. The information to be displayed along with the image signal includes focal length information, shutter speed information, aperture value information, imaging mode information, and focus state information.

Also, the liquid crystal monitor 16 displays a setting screen that the user uses to make various settings in a specific imaging/reproduction mode on the basis of a command from the image display controller 15.

When the user captures an image, first the power button 70 is switched on. This sends power to the digital camera 200 main body. Then, the imaging/reproduction mode switching lever 71 is put in the imaging mode. This causes an optical image of the subject which has been converted into an electrical image signal by the imaging sensor 11 to be displayed as a visible image on the liquid crystal monitor 16 on the basis of a command from the image display controller 15.

When the digital camera 200 is in its imaging mode and the user presses the menu button 72, the liquid crystal monitor 16 displays the setting categories that can be changed by the user in imaging mode as an iconized setting menu screen on the basis of a command from the image display controller 15.

1.8: Interchangeable Lens Unit Control System

Figure 7:
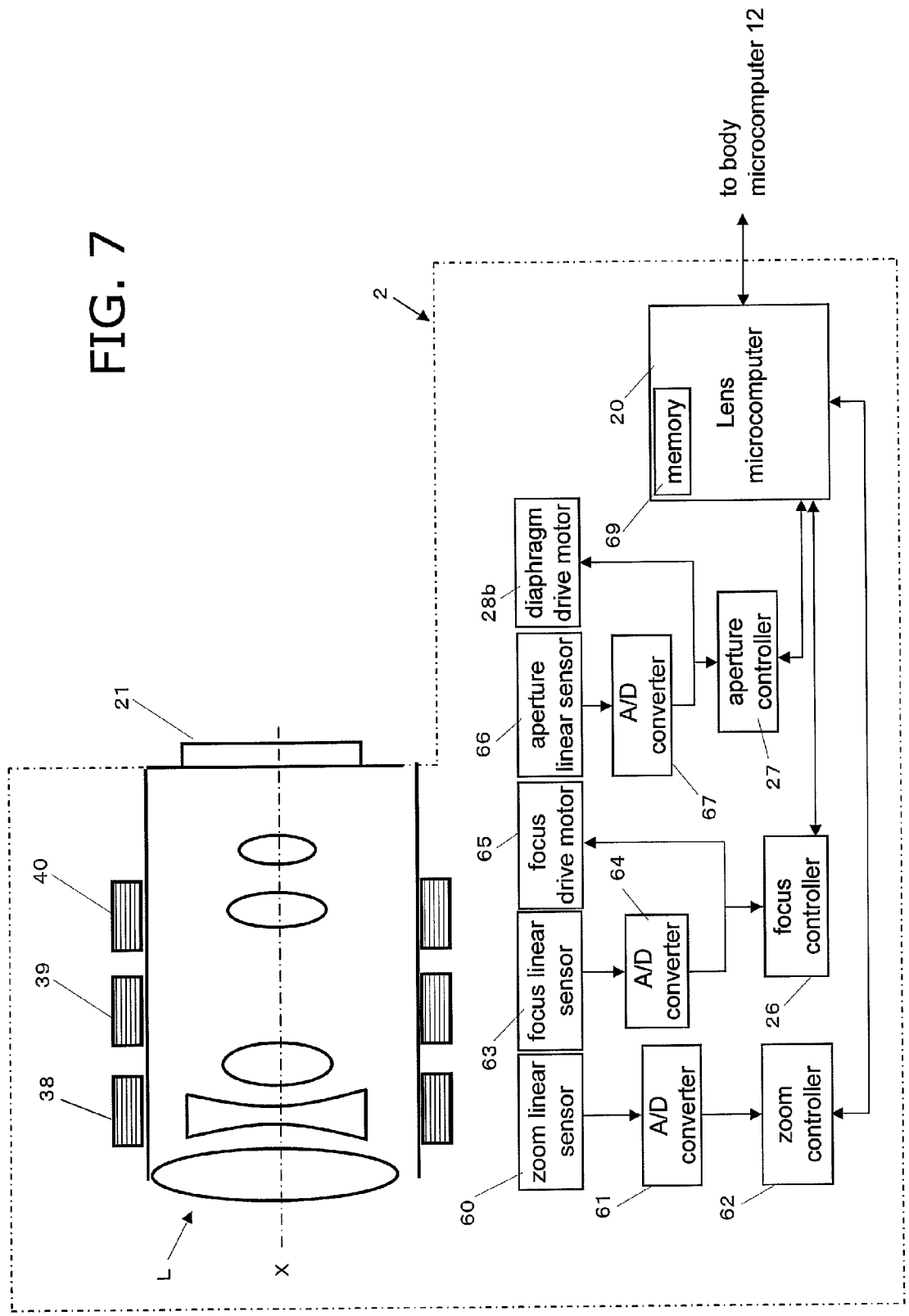
FIG. 7 is a block diagram of the control system of an interchangeable lens unit.

FIG. 7 is a block diagram of the control system for the interchangeable lens unit 2.

The lens microcomputer 20 can perform bidirectional communication between the lens microcomputer 20 and a zoom controller 62, bidirectional communication between the lens microcomputer 20 and the focus controller 26, and bidirectional communication between the lens microcomputer 20 and the aperture controller 27.

The zoom controller 62 can receive signals from a zoom linear sensor 600 via an A/D converter 601. The zoom controller 62 converts the amount of rotation of the zoom ring 38 detected by the zoom linear sensor 600 into focal length information about the optical system L. The zoom controller 62 sends focal length information to the lens microcomputer 20.

The focus controller 26 can receive signals from a focus linear sensor 63 via an A/D converter 64, and can send signals to a focus drive motor 65. The focus controller 26 determines the focus mode from the rotational angle of the focus ring 39, which is detected by the focus linear sensor 63 and digitized by the A/D converter 64. The focus controller 26 sends the result of this determination to the lens microcomputer 20. The focus controller 26 sends object distance information detected from the rotational angle of the focus ring 39 to the lens microcomputer 20 on the basis of a command from the lens microcomputer 20. The focus controller 26 drives the focus drive motor 65 on the basis of a control signal from the lens microcomputer 20.

The aperture controller 27 can receive signals from the aperture linear sensor 66 via the A/D converter 67, and can send signals to the diaphragm drive motor 28b. The aperture controller 27 determines the aperture mode from the rotational angle of the aperture ring 40, which is detected by the aperture linear sensor 66 and digitized by the A/D converter 67. The aperture controller 27 sends the result of this determination to the lens microcomputer 20. The aperture controller 27 sends aperture value information detected from the rotational angle of the aperture ring 40 to the lens microcomputer 20 on the basis of a command from the lens microcomputer 20. The aperture controller 27 drives the diaphragm drive motor 28b on the basis of a control signal from the lens microcomputer 20.

2: Operation of Digital Camera

Next, the photographic operation of the digital camera 200 will be described.

2.1: Operation When Power is On

Power supply is provided to the digital camera 200 main body when the power button 70 is switched on by the user. Power is then supplied from a power supply unit (not shown) to the various units and the body microcomputer 12 inside the digital camera 200. Similarly, power is supplied from a power supply unit to the various units and the body microcomputer 12 inside the interchangeable lens unit 2 via the lens mount 21 and the body mount 23. The body microcomputer 12 accepts various lens data via the lens mount 21 and the body mount 23, and stores this data in the built-in memory 68.

2.2: Operation in Viewfinder Imaging Mode

First, the drive sequence in viewfinder imaging mode, in which the user captures an image while looking through the viewfinder window 9, will be described on the basis of FIGS. 1, 2, 6, and 7.

In viewfinder imaging mode, as discussed above, the subject can be checked through the viewfinder window 9. When the user looks through the viewfinder window 9 and decides on the composition, the release button 30 is pressed half-way down to perform autofocusing and the like.

When the user presses the release button 30 halfway down, the digital camera 200 performs autofocusing. More specifically, the body microcomputer 12 acquires the amount of defocus (hereinafter referred to as the Df amount) from the focus detection unit 5, and instructs the lens microcomputer 20 to drive the focus lens group 25 by this Df amount. The lens microcomputer 20 controls the focus controller 26 so as to operate the focus lens group 25 by the Df amount. As this focus detection and drive of the focus lens group 25 are repeated, the Df amount decreases, and at the point when the amount drops to or below a specific level, the body microcomputer 12 determines that focus has been achieved and halts the drive of the focus lens group 25. The digital camera 200 also allows for a setting as to whether or not autofocus will be performed. If the camera is set not to perform autofocus, manual focus is possible. Manual focus is performed by turning the focus ring 39. The rotation of the focus ring 39 drives the focus drive motor 65 as mentioned above, the focus ring 39 moves in the optical axis X direction, and the object distance of the optical system L is changed.

After this, when the user presses the release button 30 all the way down, the body microcomputer 12 instructs the lens microcomputer 20 to adjust the aperture value to what has been calculated on the basis of the output from a light sensor (not shown). The lens microcomputer 20 controls the aperture controller 27, and the aperture is stopped-down to the designated aperture value. Simultaneously with the designation of the aperture value, the body microcomputer 12 uses the quick return mirror controller 60 to retract the quick return mirror 4 from within the optical path X. Upon completion of the retraction of the quick return mirror 4, the imaging sensor controller 13 instructs that the imaging sensor 11 be driven, and instructs that the shutter unit 10 be operated. The shutter unit 10 exposes the imaging sensor 11 for the length of time of the shutter speed calculated on the basis of the output from a light sensor (not shown).

Upon completion of this exposure, the imaging sensor controller 13 reads image data from the imaging sensor 11, and after undergoing specific image processing, this image data is displayed as a captured image on the liquid crystal monitor 16. Also, image data that has been read from the imaging sensor 11 and has undergone specific image processing is written as image data to a recording medium via the image recorder 18. Also, upon completion of the exposure, the quick return mirror 4 and the shutter unit 10 are reset to their initial positions. The body microcomputer 12 instructs the lens microcomputer 20 to reset the aperture to its open position, and the lens microcomputer 20 issues reset commands to the various units. Upon completion of this resetting, the lens microcomputer 20 notifies the body microcomputer 12 of the completion of resetting. The body microcomputer 12 waits for the completion of a series of processing after exposure and the reset completion information from the lens microcomputer 20, and then confirms that the release button 30 has not been pressed, which concludes the imaging sequence.

2.3: Operation in Monitor Imaging Mode

Next, the drive sequence in monitor imaging mode, in which the user captures an image using the liquid crystal monitor 16, will be described through reference to FIGS. 1, 3, 6, and 7.

When the liquid crystal monitor 16 is used to capture an image, the user presses the imaging mode switching button 75 to set the camera to monitor imaging mode. When the camera is set to monitor imaging mode, the body microcomputer 12 retracts the quick return mirror 4 from within the optical path X (FIG. 3). As a result, light from the subject reaches the imaging sensor 11. The imaging sensor 11 converts the light from the subject imaged on the imaging sensor 11 into image data, allowing it to be acquired and outputted as image data. The image data read from the imaging sensor 11 by the imaging sensor controller 13 is subjected to specific image processing, after which it is displayed as a captured image on the liquid crystal monitor 16. The acquisition of image data by the imaging sensor 11 is carried out at specific intervals, and the acquired image data causes captured images to be successively refreshed and displayed on the liquid crystal monitor. Thus displaying a moving picture of the subject on the liquid crystal monitor 16 allows the user to follow the subject without looking through the viewfinder eyepiece window 9. In the monitor imaging mode, the liquid crystal monitor 16 functions as an electronic viewfinder.

Next, the user presses the release button 30 halfway down, whereupon the body microcomputer 12 uses the quick return mirror controller 60 to return the quick return mirror 4 to a specific position within the optical path X (FIG. 2), acquires the Df amount from the focus detection unit 5, and instructs the lens microcomputer 20 to drive the focus lens group 25 by this Df amount. The lens microcomputer 20 controls the focus controller 26 so as to operate the focus lens group 25 by the Df amount. As this focus detection and drive of the focus lens group 25 are repeated, the Df amount decreases, and at the point when the amount drops to or below a specific level, the body microcomputer 12 determines that focus has been achieved and halts the drive of the focus lens group 25.

After this, when the user presses the release button 30 all the way down, the body microcomputer 12 instructs the lens microcomputer 20 to adjust the aperture value to what has been calculated on the basis of the output from a light sensor (not shown). The lens microcomputer 20 controls the aperture controller 27, and the aperture is stopped-down to the designated aperture value. Simultaneously with the designation of the aperture value, the body microcomputer 12 uses the quick return mirror controller 60 to retract the quick return mirror 4 from within the optical path X (FIG. 3). Upon completion of the retraction of the quick return mirror 4, the imaging sensor controller 13 instructs that the imaging sensor 11 be driven, and instructs that the shutter unit 10 be operated. The shutter unit 10 exposes the imaging sensor 11 for the length of time of the shutter speed calculated on the basis of the output from a light sensor (not shown).

Upon completion of this exposure, the imaging sensor controller 13 reads image data from the imaging sensor 11, and after undergoing specific image processing, this image data is displayed as a captured image on the liquid crystal monitor 16. Also, image data that has been read from the imaging sensor 11 and has undergone specific image processing is written as image data to a removable memory via the image recorder 18. Also, upon completion of the exposure, the quick return mirror 4 is positioned in a state of being retracted from within the optical path X, and a moving picture of the subject is then be displayed on the liquid crystal monitor 16.

When the monitor imaging mode is to be canceled, the user presses the imaging mode switching button 75 and changes back to the ordinary imaging mode, that is, the viewfinder imaging mode in which the user looks through the viewfinder window 9 to capture an image. When the camera is changed back to viewfinder imaging mode, the quick return mirror 4 is returned to a specific position within the optical path X (FIG. 2). The quick return mirror 4 is also returned to a specific position within the optical path X when the power is shut off to the digital camera 200 (FIG. 2).

2.4: Exposure Setting Operation for Digital Camera

Next, the operation of setting the exposure for the digital camera 200 will be described through reference to FIGS. 4 and 6. The exposure is mainly set by the shutter speed and the aperture value. The digital camera 200 has four exposure setting modes: a programmed imaging mode in which exposure setting is performed automatically for an ordinary imaging region; a shutter speed preferential imaging mode in which the shutter speed is set manually and the aperture value is set automatically; an aperture preferential imaging mode in which the aperture value is set manually and the shutter speed is set automatically; and a manual imaging mode in which the shutter speed and aperture value are both set manually.

A user operating the digital camera 200 can select among the four exposure setting modes by combined operation of the aperture ring 40 and the shutter speed setting dial 31. Specifically, in a state in which the letter "A" on the aperture ring 40 lines up with the pointer 33, the user can set the camera to the programmed imaging mode by putting the shutter speed setting dial 31 in the auto position. In a state in which the letter "A" on the aperture ring 40 lines up with the pointer 33, the user can set the camera to the shutter speed preferential imaging mode by putting the shutter speed setting dial 31 in the manually settable position. In a state in which any of the numbers "2" to "11" on the aperture ring 40 lines up with the pointer 33, the user can set the camera to the aperture preferential imaging mode by putting the shutter speed setting dial 31 in the auto position. In a state in which any of the numbers "2" to "11" on the aperture ring 40 lines up with the pointer 33, the user can set the camera to the manual imaging mode by putting the shutter speed setting dial 31 in the manual position.

From here on, of these four exposure setting modes, the programmed imaging mode and the shutter speed preferential imaging mode will be collectively referred to as the auto aperture mode, and the aperture preferential imaging mode and manual imaging mode will be collectively referred to as the manual aperture mode.

2.5: Exposure Setting Operation in Auto Aperture Mode

The aperture linear sensor 66 outputs a signal corresponding to rotational angle of the aperture ring 40 to the aperture controller 27 via the A/D converter 67. When the letter "A" on the aperture ring 40 lines up with the pointer 33, and the user presses the release button 30, the aperture controller 27 determines that the exposure setting mode is the auto aperture mode on the basis of the signal received from the aperture linear sensor 66, and sends information to this effect to the lens microcomputer 20 and the body microcomputer 12. Sending to the body microcomputer 12 is carried out via microcomputer communication between the lens microcomputer 20 and the body microcomputer 12. The shutter speed setting dial 31 outputs a signal corresponding to the rotational angle to the body microcomputer 12.

The body microcomputer 12 decides that the exposure setting mode is the auto aperture mode on the basis of the information indicating that the auto aperture mode has been set. The body microcomputer 12 also decides whether the exposure setting mode is the programmed imaging mode or the shutter speed preferential imaging mode on the basis of the signal from the shutter speed setting dial 31 and the information indicating that the auto aperture mode has been set.

The body microcomputer 12 sends a command to the digital signal processor 53. The digital signal processor 53 sends the body microcomputer 12 an image signal at a specific timing on the basis of the received command. The body microcomputer 12 computes an exposure value on the basis of the received image signal. If the exposure setting mode is the programmed imaging mode, the body microcomputer 12 computes a suitable combination from the adjustable aperture value and shutter speed. If the exposure setting mode is the shutter speed preferential imaging mode, the body microcomputer 12 computes a suitable aperture value for the set shutter speed.

The body microcomputer 12 produces a control signal on the basis of the computation result. The body microcomputer 12 sends a control signal based on the computed aperture value to the aperture controller 27 via the lens microcomputer 20 of the interchangeable lens unit 2. If the exposure setting mode is the programmed imaging mode, the body microcomputer 12 sends a control signal based on the computed shutter speed to the shutter controller 14. If the exposure setting mode is the shutter speed preferential imaging mode, the body microcomputer 12 sends the shutter controller 14 information about the shutter speed set with the shutter speed setting dial 31.

Also, the body microcomputer 12 sends a control signal to the image display controller 15. The image display controller 15 drives the liquid crystal monitor 16. When the content of the control signal designates the programmed imaging mode, the liquid crystal monitor 16 gives a display indicating that the exposure setting mode is the programmed imaging mode. When the content of the control signal designates the shutter speed preferential imaging mode, the liquid crystal monitor 16 gives a display indicating that the exposure setting mode is the shutter speed preferential imaging mode.

The aperture controller 27 produces a drive signal for driving the diaphragm drive motor 28*b* on the basis of a control signal from the lens microcomputer 20. The diaphragm drive motor 28*b* is driven on the basis of this drive signal. The drive of the diaphragm drive motor 28*b* results in the aperture blades being driven.

The shutter controller 14 produces a drive signal for driving the shutter drive motor 10*a* on the basis of a control signal from the body microcomputer 12. The shutter drive motor 10*a* is driven on the basis of this drive signal. The drive of the shutter drive motor 10*a* results in the shutter unit 10 being driven.

Exposure setting in the auto aperture mode of the digital camera 200 is performed as discussed above. The above operation is executed instantly after the release button 30 has been pressed by the user.

When imaging is complete, the body microcomputer 12 sends a control signal to the image recording controller 17. The image recorder 18 records an image signal to a recording medium on the basis of a command from the image recording controller 17.

When the content of the control signal designates the programmed imaging mode, the image recorder 18 records an image signal along with information indicating that the exposure setting mode is the programmed imaging mode to a recording medium on the basis of a command from the image recording controller 17. When the content of the control signal designates the shutter speed preferential imaging mode, the image recorder 18 records an image signal along with information indicating that the exposure setting mode is the shutter speed preferential imaging mode to a recording medium on the basis of a command from the image recording controller 17.

2.6: Exposure Setting Operation in Manual Aperture Mode

Next, when the position of any of the numbers "2" to "11" on the aperture ring 40 lines up with the pointer 33, and the user presses the release button 30, the aperture controller 27 determines sends the lens microcomputer 20 information related to the aperture value set by the user on the basis of the signal received from the aperture linear sensor 66 via the A/D converter 67. The lens microcomputer 20 outputs information related to the set aperture value (hereinafter referred to as aperture value information) to the body microcomputer 12. The shutter speed setting dial 31 outputs a signal corresponding to rotational angle to the body microcomputer 12.

The body microcomputer 12 decides that the exposure setting mode is the manual aperture mode on the basis of the aperture value information. Also, the body microcomputer 12 decides whether the exposure setting mode is the aperture preferential imaging mode or the manual aperture mode on the basis of the decision result that the exposure setting mode is the manual aperture mode, and a signal received from the shutter speed setting dial 31.

If the exposure setting mode is the aperture preferential imaging mode, the body microcomputer 12 sends a command to the digital signal processor 53. The digital signal processor 53 sends an image signal to the body microcomputer 12 at a specific timing on the basis of the received command.

If the exposure setting mode is the aperture preferential imaging mode, the body microcomputer 12 performs the following operation. The body microcomputer 12 computes the shutter speed on the basis of the received image signal and the aperture value information. The body microcomputer 12 produces a control signal on the basis of the computation result. The body microcomputer 12 sends a control signal based on the computed shutter speed to the shutter controller 14.

If the exposure setting mode is the manual imaging mode, the body microcomputer 12 sends information about the shutter speed set with the shutter speed setting dial 31 to the shutter controller 14.

Also, the body microcomputer 12 sends a control signal to the image display controller 15. The image display controller 15 drives the liquid crystal monitor 16. When the content of the control signal designates the aperture preferential imaging mode, the liquid crystal monitor 16 gives a display indicating that the exposure setting mode is the aperture preferential imaging mode. When the content of the control signal designates the manual imaging mode, the liquid crystal monitor 16 gives a display indicating that the exposure setting mode is the manual imaging mode.

The aperture controller 27 produces a drive signal for driving the diaphragm drive motor 28b on the basis of a control signal from the lens microcomputer 20. The diaphragm drive motor 28b is driven on the basis of this drive signal. The drive of the diaphragm drive motor 28b results in the aperture blades being driven, and in the aperture being in an open state corresponding to the set aperture value. The shutter controller 14 produces a drive signal for driving the shutter drive motor 10a on the basis of a control signal from the body microcomputer 12. The shutter drive motor 10a is driven on the basis of this drive signal. The drive of the shutter drive motor 10a results in the shutter unit 10 being driven. The shutter unit 10 exposes the imaging sensor 11 for a length of time equal to the set shutter speed.

Exposure setting in the manual aperture mode of the digital camera 200 is performed as discussed above. The above operation is executed instantly after the operation of the release button 30 by the user.

When imaging is complete, the body microcomputer 12 sends a control signal to the image recording controller 17. The image recorder 18 records an image signal to a recording medium on the basis of a command from the image recording controller 17.

When the content of the control signal designates the aperture preferential mode, the image recorder 18 records an image signal along with information indicating that the exposure setting mode is the aperture preferential mode to a recording medium on the basis of a command from the image recording controller 17. When the content of the control signal designates the manual imaging mode, the image recorder 18 records an image signal along with information indicating that the exposure setting mode is the manual imaging mode to a recording medium on the basis of a command from the image recording controller 17.

2.7: Operation in Continuous Imaging Mode

The drive sequence in continuous imaging mode, in which a plurality of images are continuously captured by changing the imaging conditions by a single operation of the release button 30, will be described through reference to FIGS. 1, 3, 6, and 7.

When the imaging/reproduction mode switching lever 71 is turned and the continuous imaging mode is selected, the fact that the continuous imaging mode has been selected is sent to the body microcomputer 12. Also, the body microcomputer 12 sends a control signal to the image display controller 15. The image display controller 15 drives the liquid crystal monitor 16. The liquid crystal monitor 16 displays a control screen for selecting the imaging conditions to perform continuous imaging.

The user operates the directional arrow key 73 to select the imaging conditions displayed on the control screen, and pushes the set button 74 to confirm the imaging conditions. The body microcomputer 12 decides the selected imaging conditions. A plurality of images (hereinafter these images will also be referred to as "a series of images") are continuously captured while varying the image brightness, exposure, aperture value, and so forth, which are examples of imaging conditions. The user also operates the directional arrow key 73 to confirm the values of the conditions to be changed, etc.

The operation of continuous imaging while the user changes the aperture value will now be described as an example.

When the aperture value is selected and confirmed as an imaging condition, the body microcomputer 12 commands the lens microcomputer 20 to set the aperture value to the lowest settable aperture value (such as F2), regardless of the aperture value set with the aperture ring 40 (such as F8).

Also, the body microcomputer 12 sends a control signal to the image display controller 15. The image display controller 15 drives the liquid crystal monitor 16. If the content of the control signal designates the continuous imaging mode using a change in aperture value, the liquid crystal monitor 16 creates a display to the effect that the mode is the continuous imaging mode using a change in aperture value.

After the user has pushed the release button 30 all the way down, the same imaging operation as when the above-mentioned exposure setting mode is the aperture preferential imaging mode is performed repeatedly, increasing the aperture value one stage at a time from the lowest value. The operation after the release button 30 has been pushed all the way down will now be described in specific terms.

The body microcomputer 12 computes a suitable shutter speed for the aperture value used in imaging. The body microcomputer 12 produces a control signal on the basis of the computation result. The body microcomputer 12 sends a control signal to the shutter controller 14 on the basis of the computed shutter speed (step S1).

The aperture controller 27 produces a drive signal for driving the diaphragm drive motor 28b on the basis of a control signal from the lens microcomputer 20. The diaphragm drive motor 28b is driven on the basis of the drive signal. The drive of the diaphragm drive motor 28b results in the aperture blades being driven, and in the aperture being in an open state corresponding to the set aperture value. The shutter controller 14 produces a drive signal for driving the shutter drive motor 10a on the basis of a control signal from the body microcomputer 12 (step S2).

The shutter drive motor 10a is driven on the basis of this drive signal. The drive of the shutter drive motor 10a results in the shutter unit 10 being driven. The shutter unit 10 exposes the imaging sensor 11 for a length of time equal to the set shutter speed. The imaging sensor 11 resets the charge to that prior to the start of exposure, and a charge is accumulated by exposure. The imaging sensor 11 then outputs an image signal (step S3).

In this manner, a single image is captured according to the set imaging conditions. When the imagine is complete, the body microcomputer 12 sends a control signal to the image recording controller 17. The image recorder 18 records an image signal to a recording medium on the basis of a command from the image recording controller 17. If the aperture value during imaging the previous time is the highest, the body microcomputer 12 ends the imaging operation. If the aperture value during imaging the previous time is not the highest, a command is sent to the lens microcomputer 20 to use an aperture value one step higher in the next imaging. When this command is received, the flow returns to the operation of step S1 (step S4).

Possible methods for changing the aperture value include a method in which the aperture value is changed one step at a time from the highest to the lowest value, a method in which the aperture value is changed two steps at a time, and so forth.

Figure 8:
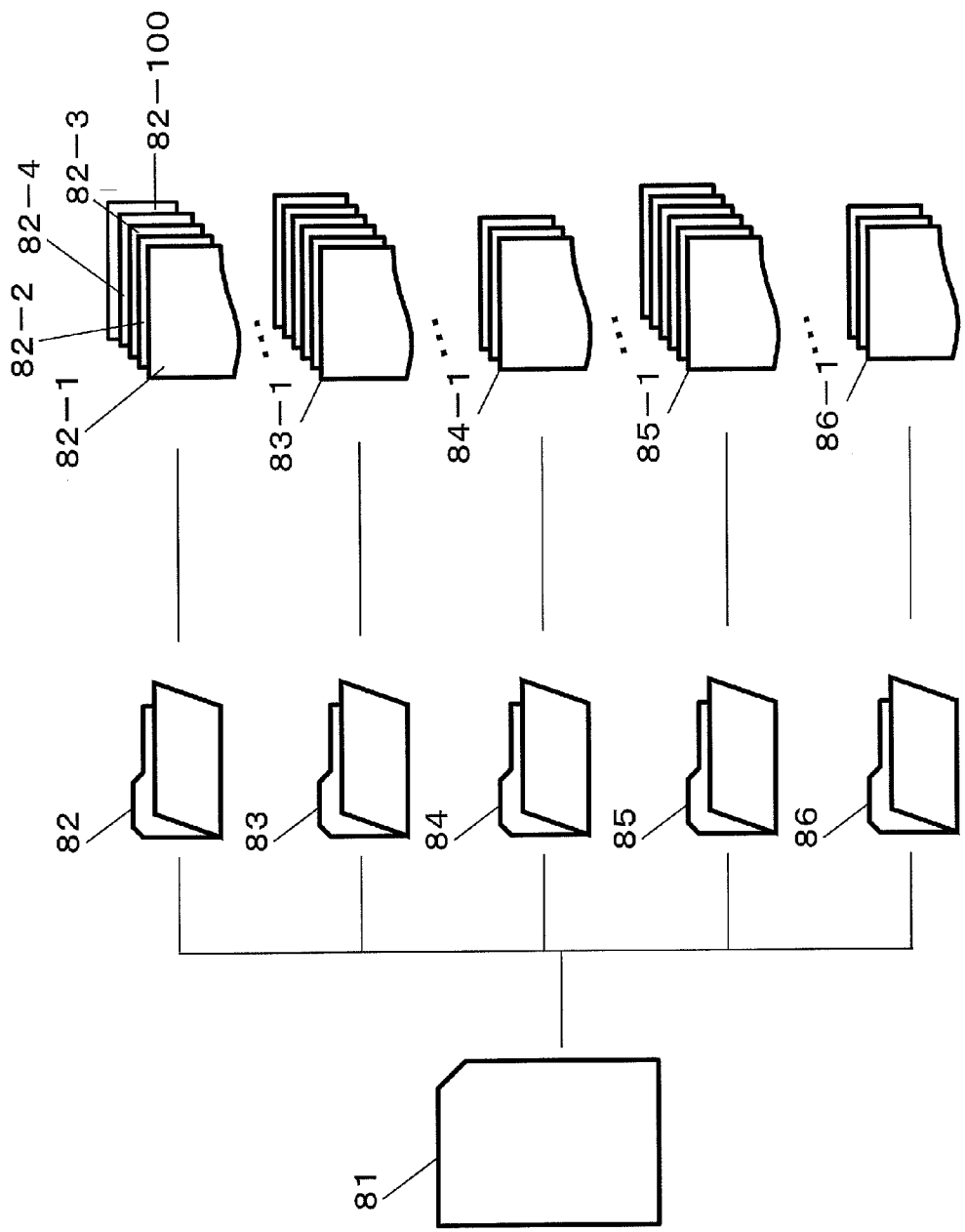
FIG. 8 is a simplified diagram illustrating the configuration of a folder for recording captured images.

FIG. 8 shows a folder structure in the recording of a series of captured images to a removable memory or other such recording medium 81. One folder is produced under the recording medium 81 every time the user captures a series of images. Folders 82 to 86 correspond to a total of five instances of continuous imaging. At the same time, the body microcomputer 12 stores all of the series of images (images 82-1, 82-2, and 82-3) in respective folders. The body microcomputer 12 also stores in the folder 82 the file 82-100, in which is recorded information about how the imaging conditions were varied when the series of images stored in the one folder 82 were captured, and the values and other such information for each of these images. Of this series of images, the aperture value of image 82-1 is 2, the F value of image 82-2 is 5.6, and the F value of image 82-3 is 8.

2.8: Operation in Comparison Reproduction Mode

The digital camera 200 has a comparison reproduction mode in which a plurality of images continuously captured by the user are reproduced so as to afford easy comparison. This comparison reproduction mode will now be described.

Figure 9:
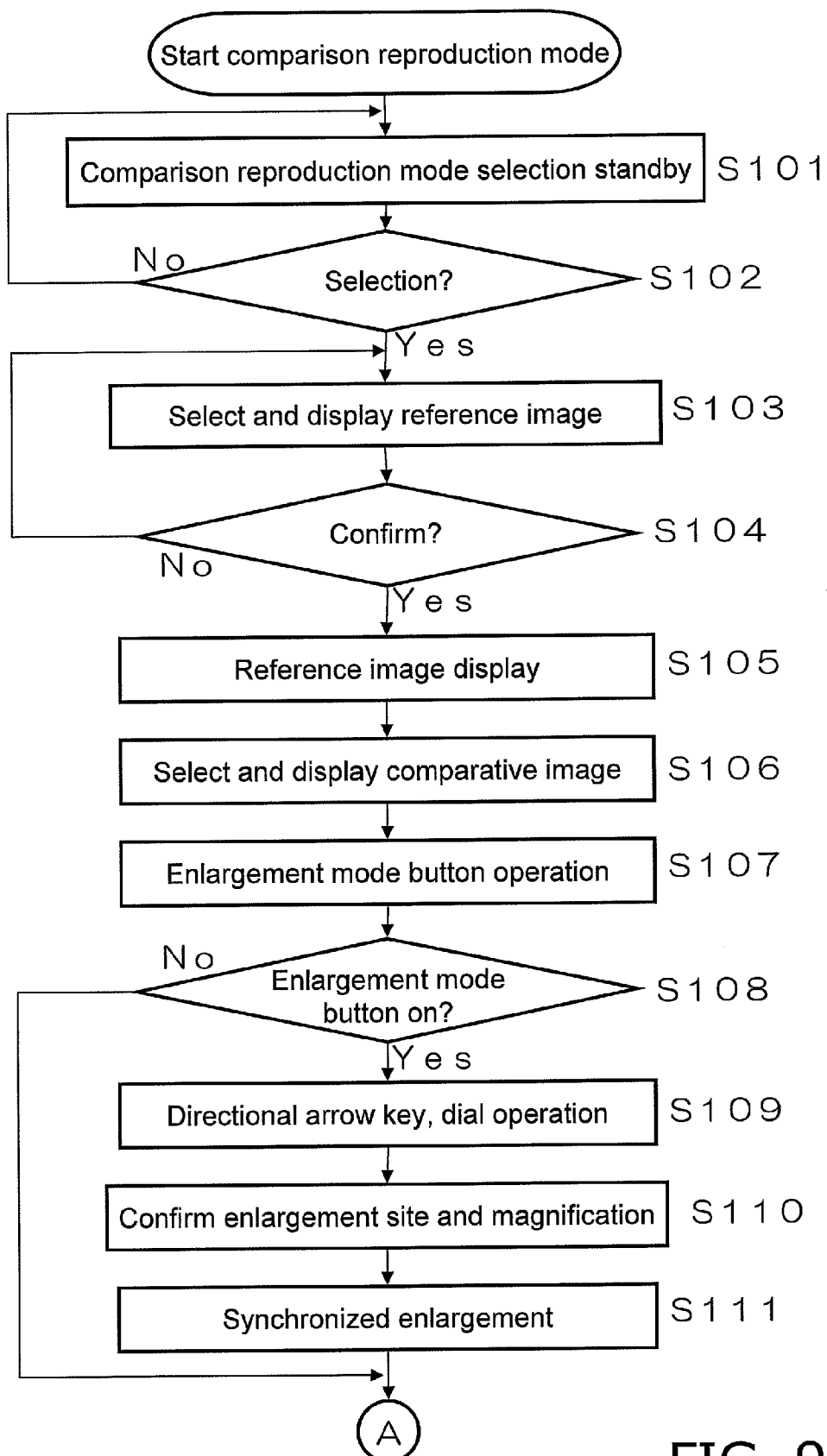
FIG. 9 is a flowchart of a comparison reproduction mode.
Figure 10:
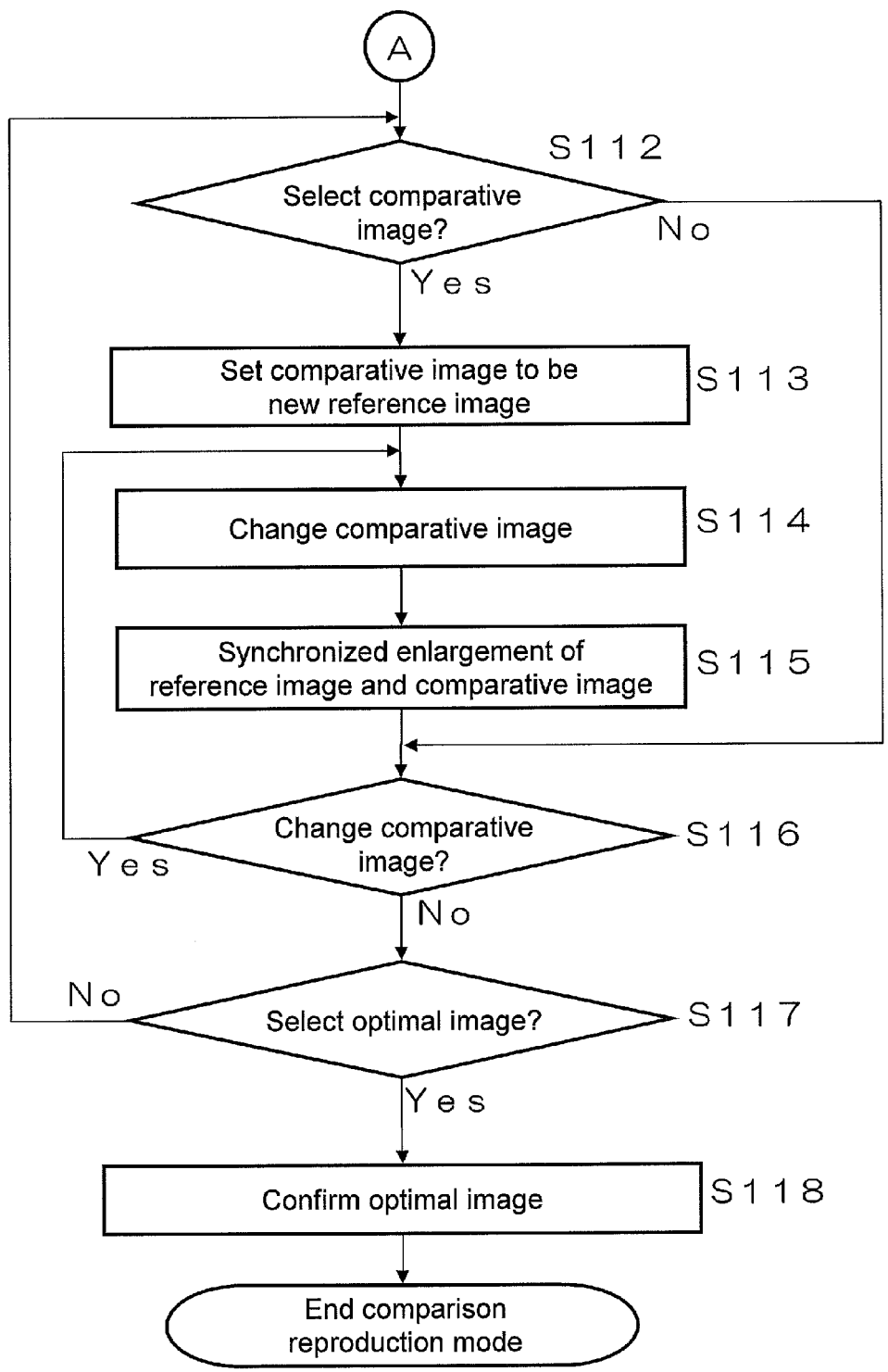
FIG. 10 is a flowchart of a comparison reproduction mode (enlarged display mode)

FIGS. 9 and 10 are a flowchart illustrating the operation in comparison reproduction mode. The body microcomputer 12 decides whether or not the comparison reproduction mode has been selected with the imaging/reproduction mode switching lever 71 (step S101). If the comparison reproduction mode has been selected, the camera is switched to comparison reproduction mode (step S102).

Figure 11:
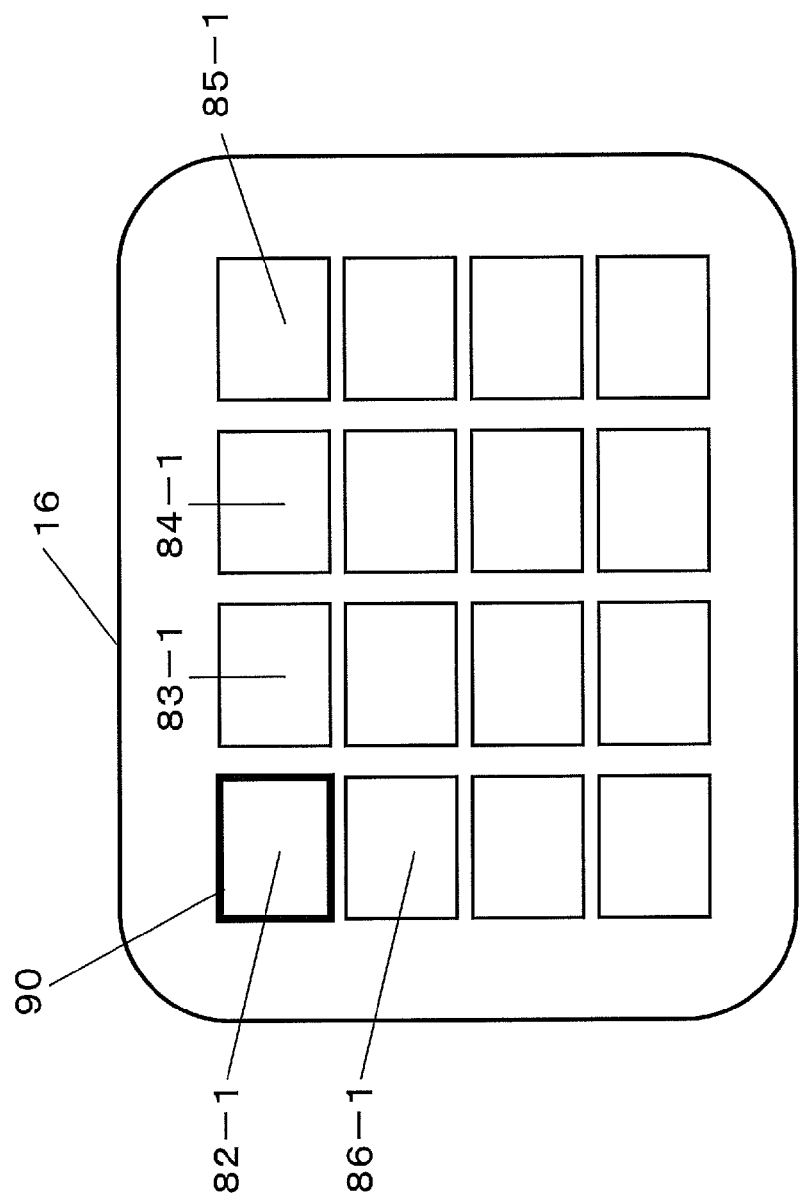
FIG. 11 is a diagram of a thumbnail display for selecting a series of images.

In comparison reproduction mode, the image display controller 15 displays a single representative image from each folder in thumbnail view on the liquid crystal monitor 16, as shown in FIG. 11. The user uses the directional arrow key 73 to select an image by placing a cursor box 90 over the thumbnail image selected from the plurality of thumbnail images displayed on the liquid crystal monitor 16 as shown in FIG. 11, and presses the confirmation button 77 to select the series of images from which the optimal image is selected. When the user has selected thumbnail image 82-1 in FIG. 11, the body microcomputer 12 proceeds to the stage at which the user selects the optimal images from the series of images in the folder 82 in which the image 82-1 is stored. The image display controller 15 displays the image 82-1 on the liquid crystal monitor 16. The liquid crystal monitor 16 is split into the first display region 16a (the region on the left half) and the second display region 16b (the region on the right half), and the cursor box 90 is displayed in one of these regions. Next, the user turns the dial 78 to select a first image that will serve as a reference from among the series of recorded images. An example of this display is shown in FIGS. 12A and 12B. First, the image 82-1 with an aperture value of F2 is displayed as in the display example in FIG. 12A. When the dial 78 is turned one step to the right, the image 82-2 with the next larger aperture value of F5.6 is displayed as in the display example in FIG. 12B. When the dial 78 is turned one step to the left, the image 82-1 with the next smaller aperture value of F2 is displayed as in the display example in FIG. 12A. After the image serving as the reference is selected with the dial 78, the directional arrow key 73 is operated to place the cursor box 90 in either the left or right half of the screen, and the image displayed in one or the other is selected as the reference image (step S103).

After this, the reference image is confirmed by pressing the confirmation button 77 (step S104). The following description will proceed for a case in which the left half of the image with an aperture value of F2 has been selected.

The image display controller 15 displays the reference image on one side of the liquid crystal monitor 16 (the first display region 16a) (step S105). Next, the image display controller 15 displays a second image as a comparative image on the side of the liquid crystal monitor 16 where the reference image is not displayed (the second display region 16b). The image display controller 15 selects one different image from the folder in which the image selected as the reference image is recorded, and displays the same part as the reference image, that is, the left half selected with the cursor box 90, as a comparative image on the right half of the liquid crystal monitor 16 (the second display region 16b). In this embodiment, the image that is the left half of the image 82-2 of F5.6 is displayed on the right half of the liquid crystal monitor 16 (the second display region 16b). Thus, the same parts of a plurality of images captured under different conditions are displayed side by side on the liquid crystal monitor 16.

Next, the user turns the dial 78 to select a comparative image from among the images other than the reference image out of the series of images recorded to the folder 82 (step S106). Display examples of this are shown in FIGS. 13A and 13B. As shown in the display example in FIG. 13A, the liquid crystal monitor 16 displays the reference image (the left half of the image 82-1 acquired at an aperture value of F2) in the first display region 16a, and the above-mentioned comparative image (the left half of the image 82-2 of F5.6) in the second display region 16b. When the dial 78 is turned one step to the right, as shown in the display example in FIG. 13B, the liquid crystal monitor 16 displays the left half of the image 82-2 with the next larger aperture value of F8 on the right side. When the dial 78 is turned one step to the left, as shown in the display example in FIG. 13A, the liquid crystal monitor 16 displays the left half of the image 82-2 with the next smaller aperture value of F5.6 on the right side. The dial 78 can be used to refresh the display of the comparative image on the right side of the liquid crystal monitor 16 while leaving the reference image on the left alone.

At this point, the fact that both the reference image and the comparative image are images whose aperture value has been changed, and the aperture values of each, can be learned by the body microcomputer 12 from the content of the file 82-100. Using this information as a basis, the image display controller 15 displays the aperture values of the reference image and the comparative image on the liquid crystal monitor 16.

Here, if enlarged images of the selected portions of the reference image and the comparative image are to be compared in selecting between these two images, the user presses the enlargement mode button 79 (step S107). The body microcomputer 12 decides whether the enlargement mode button 79 has been pressed (step S108). If the enlargement mode button 79 has been pressed, the camera goes into enlargement mode.

Figure 14:
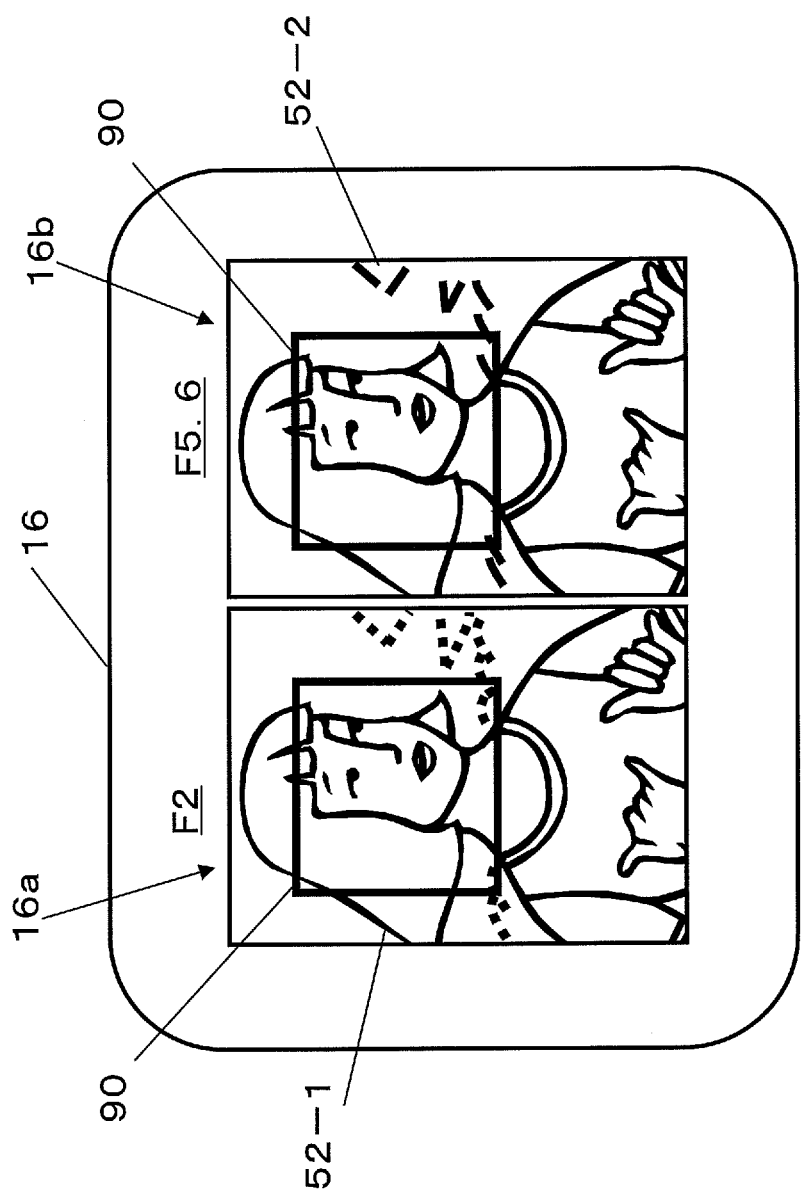
FIG. 14 is a display example of when selecting a region to be enlarged.

In enlargement mode, the user selects the places to be enlarged on the reference image and the comparative image (the regions to be enlarged) by operating the directional arrow key 73. The user also sets the display magnifications by operating the dial 78 (step S109). A display example of this is shown in FIG. 14. When the enlargement mode button 79 is pressed, two cursor boxes 90 that indicate the same regions in the reference image 82-1 and the comparative image 82-2 are added to the last display of step S106 (the display example in FIG. 13A). When the user operates the directional arrow key 73 up, down, left, or right, the two cursor boxes 90 move up, down, left, or right accordingly. Even after movement, the cursor boxes 90 show the same regions of the reference image 82-1 and the comparative image 82-2. When the user turns the dial 78, the two cursor boxes 90 change in size according to the direction and amount of rotation of the dial 78. Even after the change in size, the two cursor boxes 90 show the same regions of the reference image 82-1 and the comparative image 82-2. The regions indicated by the cursor boxes 90 are selected as the regions to be enlarged. Thus, the same regions of the reference image 82-1 and the comparative image 82-2 are selected in synchronization. In this embodiment, the range of the region to be enlarged with respect to the overall range of the reference image is made the same as the range of the region to be enlarged with respect to the overall range of the comparative image.

After this, the regions to be enlarged are confirmed by pressing the confirmation button 77 (step S11056). In the enlarged display (discussed below), the regions to be enlarged remain constant regardless of their size, so the enlargement magnification can be simultaneously confirmed from the size of the enlarged places (same step).

Figure 15:
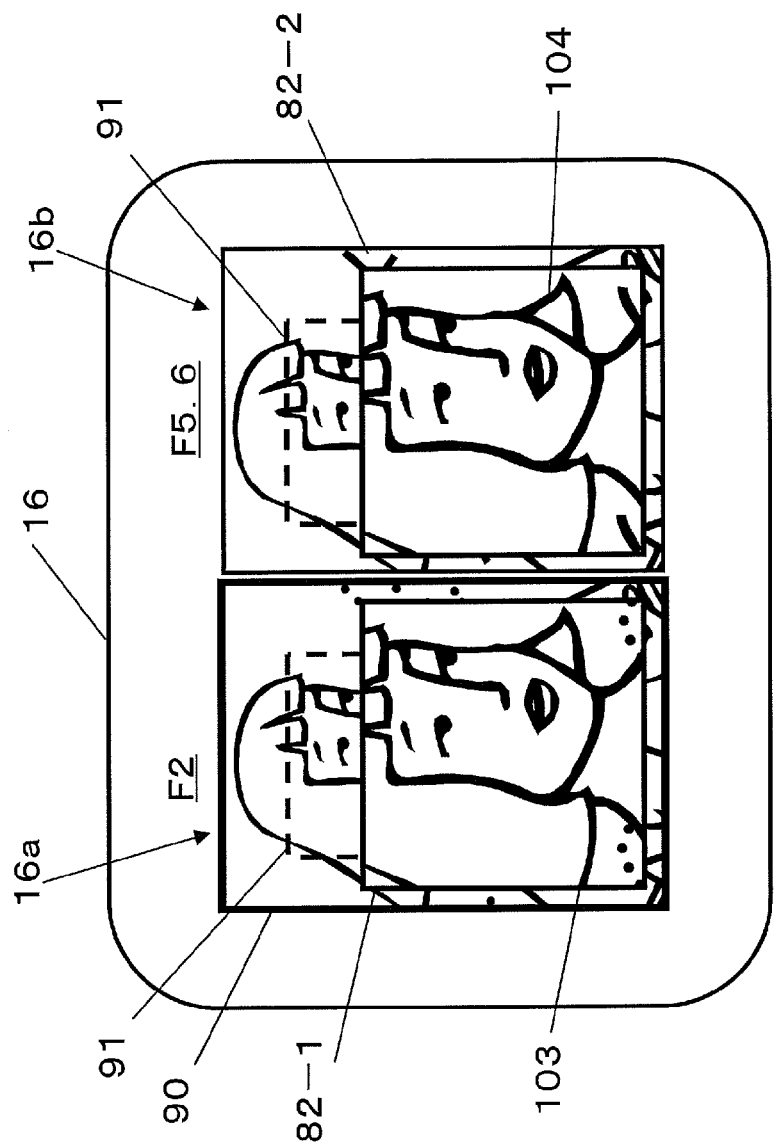
FIG. 15 is a display example of an enlarged display.

The image display controller 15 displays the enlarged parts of the reference image and comparative image along with the reference image and the comparative image on the liquid crystal monitor 16 (step S111). FIG. 15 is a display example of enlarged display. The image display controller 15 displays an enlarged image 103 of the region to be enlarged of the reference image 82-1 (hereinafter also referred to as the enlarged reference image) and an enlarged image 104 of the region to be enlarged of the comparative image 82-2 (hereinafter also referred to as the enlarged comparative image) on the liquid crystal monitor 16, overlapped with the display from step S110 (FIG. 14). The display ranges of the enlarged reference image 103 and the enlarged comparative image 104 remain constant, regardless of the size of the regions to be enlarged. Also, the enlarged reference image 103 is displayed overlapping the reference image 82-1, and the enlarged comparative image 104 is displayed overlapping the comparative image 82-2. The enlarged reference image 103 and the enlarged comparative image 104 are displayed side by side on the left and right. The cursor boxes 90 are displayed as enlargement region frames 91 that indicate the regions to be enlarged, with a different display method. Also, a cursor box 90 for selecting either the reference image 82-1 or the comparative image 82-2 is displayed in the other image display range.

Enlarged display affords easy comparison of blurring of the background (the ocean) of a subject (a woman) in focus.

Changing the Comparative Image in Enlargement Mode

When the display is in enlargement mode, if the user decides that the comparative image is preferable, and selects this comparative image, then the selected comparative image becomes the new reference image. Even after the reference image is changed, the enlargement mode display condition is maintained. This will be described using the display example in FIGS. 16A and 16B.

The user operates the directional arrow key 73 to the right or left to place the cursor box 90 on the comparative image 82-2 and select this comparative image 82-2 (the display example in FIG. 16A). After this, when the confirmation button 77 is pressed, the body microcomputer 12 decides that the comparative image 82-2 has been selected (step S112). In this case, the image display controller 15 displays the comparative image 82-2 as the new reference image on the left half of the liquid crystal monitor 16 (the first display region 16a) (step S113). Also, the image 82-1 that was the reference image is displayed on the right half of the liquid crystal monitor 16 (the second display region 16b) as the comparative image (step S114). The same applies to the enlarged reference image 103 of the reference image 82-2 and the enlarged comparative image 104 of the comparative image 82-1, while the regions to be enlarged are left the same (step S115). In this embodiment, when the comparative image is selected, the comparative image becomes the new reference image, and the left and right displays are switched (from the display example of FIG. 16A to the display example of FIG. 16B).

In the display state of the enlargement mode, when the user selects another images as the comparative image, the selected image is updated and displayed as the comparative image. Even after the comparative image has been changed, the enlargement mode display conditions are maintained.

Figure 17:
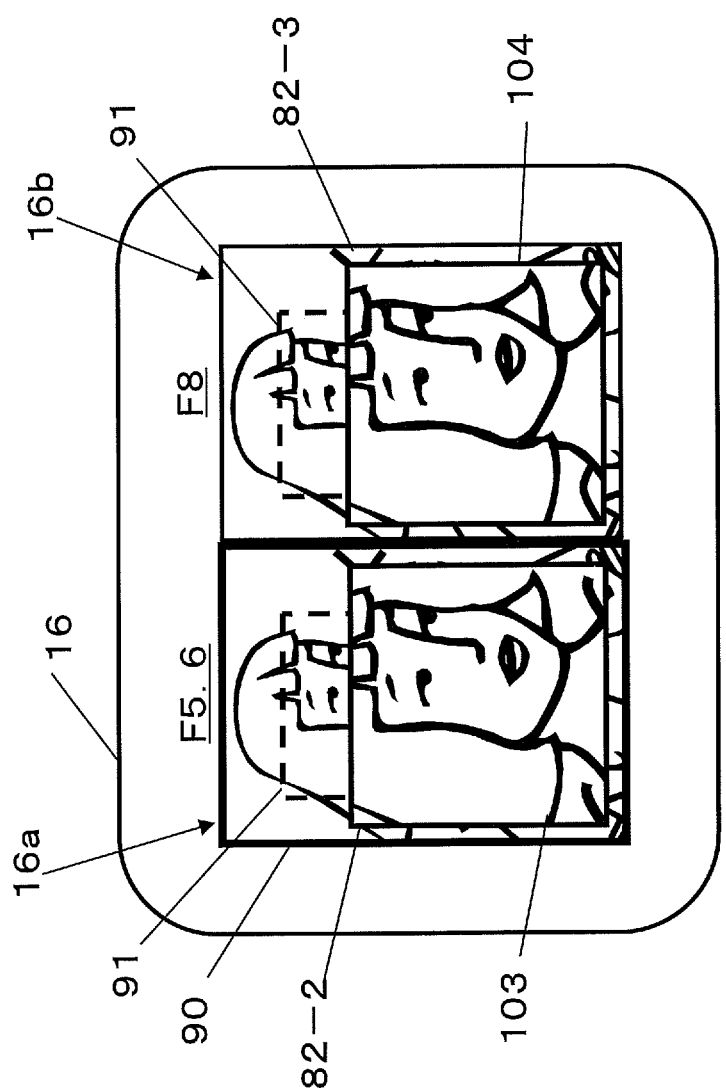
FIG. 17 is a display example of when changing the comparative image in enlarged display mode.

When the user turns the dial 78, the body microcomputer 12 decides that the comparative image has been changed (step S116). The body microcomputer 12 selects the comparative image 82-3 from among the series of images recorded to the folder 82, other than the reference image 82-2 or the currently displayed comparative image 82-1. As shown in FIG. 17, the image display controller 15 changes the comparative image from the pre-selection image 82-1 (FIG. 16B) to the selected image 82-3, and displays this on the liquid crystal monitor 16 (step S114).

Here, the display conditions of the enlargement mode are maintained. More specifically, the body microcomputer 12 stores the position and size of the regions to be enlarged in the comparative image 82-1 prior to the change of the comparative image. The image display controller 15 displays the same portion of the comparative image 82-3 after the change to the comparative image as the region to be enlarged stored in the body microcomputer 12, at the same magnification, as the enlarged comparative image 104 on the liquid crystal monitor 16 (step S115). Thus, the image display controller 15 changes the enlarged comparative image 104 in synchronization with the change to the comparative image.

The body microcomputer 12 decides whether or not the optimal image has been selected (step S117). More specifically, the body microcomputer 12 decides that the reference image 82-2 has been selected as the optimal image when the confirmation button 77 is pressed in a state in which the cursor box 90 is around the reference image 82-2, that is, in a state in which the reference image 82-2 has been selected. The body microcomputer 12 confirms the selected reference image 82-2 as the optimal image.

2.9: Operation in Image Comparison and Selection Mode

In the above-mentioned comparison reproduction mode, emphasis is placed on the user's viewing and comparing a series of images.

However, to select the optimal image from a series of images, since the above-mentioned comparison reproduction mode is such that images that have already been compared are displayed again, there is redundant work in the comparison of images, which is inefficient. This problem is more pronounced the greater is the number of images.

Figure 18:
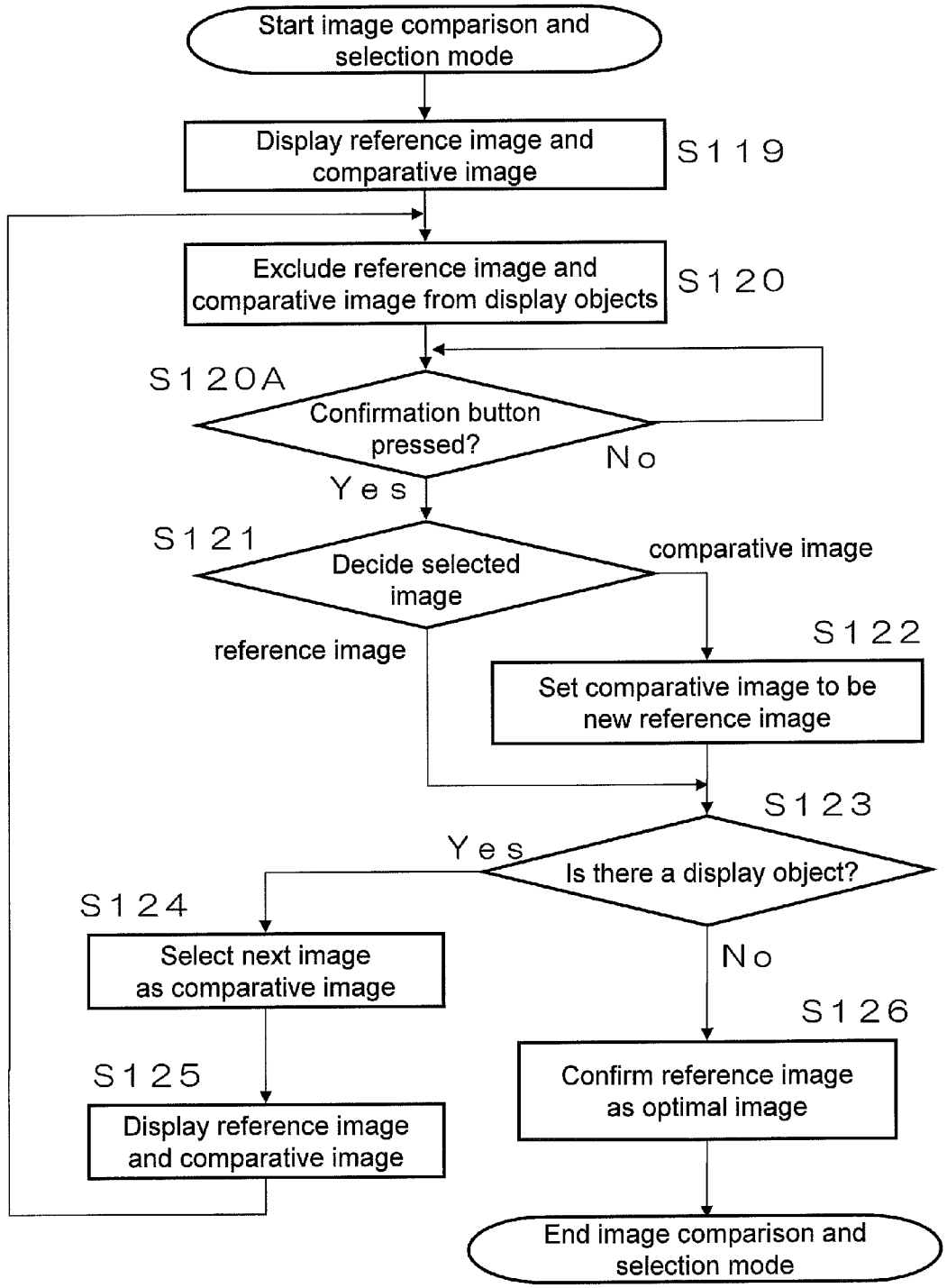
FIG. 18 is a flowchart of the image comparison and selection mode.

In view of this, the digital camera 200 has an image comparison and selection mode that is suited to selecting an optimal image from a series of images. The operation in the image comparison and selection mode will now be described. FIG. 18 is a flowchart illustrating the operation of the image comparison and selection mode. Here, just as with the comparison reproduction mode discussed above, we will use as an example a situation in which a series of images 82-1, 82-2, 82-3, and 82-4 is selected as the images to be compared and selected.

When the image comparison and selection mode button 80 is pressed, the body microcomputer 12 starts the image comparison and selection mode. More specifically, the processing from step S103 to step S106 in the above-mentioned flowchart shown in FIG. 9 is executed, so that the reference image 82-1 is displayed in the first display region 16a, and the comparative image 82-2 in the second display region 16b (step S119; FIG. 19A). The file names for the series of images 82-1, 82-2, 82-3, and 82-4 are stored in the display manager 12a, and the images 82-1, 82-2, 82-3, and 82-4 are set by the display manager 12a to be display objects as images that have yet to be displayed. More precisely, the file names "82-1," "82-2," "82-3," and "82-4" of these images 82-1, 82-2, 82-3, and 82-4 are stored in the display manager 12a.

The series of images 82-1, 82-2, 82-3, and 82-4 are images continuously captured with the aperture value set at F2, F5.6, F8, and F11, respectively. These aperture values are recorded as imaging conditions to a recording medium along with the images 82-1, 82-2, 82-3, and 82-4. More specifically, the file 82-100 (FIG. 8) recorded to the recording medium includes aperture values and other such imaging conditions. The aperture values of the images are utilized for reference in selecting images with the selector 12b in step S125.

Next, the processing proceeds to step S120. The first time this step is begun, the images 82-1, 82-2, 82-3, and 82-4 are set by the display manager 12a to be display objects, but the display manager 12a of the body microcomputer 12 deletes the file names "82-1" and "82-2" of the reference image 82-1 and the comparative image 82-2 displayed on the liquid crystal monitor 16 from the stored file names. Therefore, the remaining images 82-3 and 82-4 that have not been displayed on the liquid crystal monitor 16 are stored in the display manager 12a as display objects. Storing and deleting file names in and from the display manager 12a allows the images 82-3 and 82-4 that have not been displayed since the start of the image comparison and selection mode to be set to the display objects, out of the four images 82-1, 82-2, 82-3, and 82-4 in the folder 82 (step S120).

Next, the body microcomputer 12 monitors the operation of the confirmation button 77 of the display operation unit 69 (step S120A). The user operates the directional arrow key 73 to the left or right to move the cursor box 90 to either the reference image 82-1 or the comparative image 82-2, depending on which has been decided to be preferable, and presses the confirmation button 77, thereby selecting either the reference image 82-1 or the comparative image 82-2 (step S121). The following description will be for an example in which the comparative image 82-2 is selected.

When the comparative image 82-2 is selected, the body microcomputer 12 sets the comparative image 82-2 as the new reference image (step S122), and the processing proceeds to step S122. On the other hand, if the reference image 82-1 is selected in step S121, the processing proceeds to step S123.

The body microcomputer 12 decides whether or not an image has been displayed (step S123). More specifically, the body microcomputer 12 decides whether or not there is a display object on the basis of the file names stored in the display manager 12a. Here, since the file names "82-3" and "82-4" are stored in the display manager 12a, it can be determined that the display objects are the images 82-3 and 82-4, so the body microcomputer 12 decides that the answer is YES in step S123, and the processing proceeds to step S125.

In step S125, the body microcomputer 12 selects an image from among the images 82-3 and 82-4 that are the display objects, according to specific conditions, as the comparative image. For example, the selection may be made starting with the image with the lowest aperture value. Here, the selector 12b of the body microcomputer 12 selects as the comparative image the image 82-3, which has the lowest aperture value, from among the images 82-3 and 82-4 that are the display objects.

The body microcomputer 12 notifies the image display controller 15 which of the reference image 82-2 and the comparative image 82-3 was selected. The image display controller 15 displays the reference image 82-2 on the left half of the liquid crystal monitor 16 (the first display region 16a). Also, the image display controller 15 displays the left half of the comparative image 82-3 on the right half of the liquid crystal monitor 16 (the second display region 16b) (step S125). A display example of the liquid crystal monitor 16 at this point is shown in FIG. 19B. After this the flow returns to step S120. In step S125, the image display controller 15 may display the remaining number of undisplayed images on the liquid crystal monitor 16, that is, the number of display objects left (FIGS. 19A and 19B). In this case, for example, the data count of the file names stored in the display manager 12*a* is displayed as the number of display objects left.

The processing returns to step S120, and the body microcomputer 12 excludes the reference image 82-2 and the comparative image 82-3 from the images 82-3 and 82-4 that are display objects. More specifically, the body microcomputer 12 deletes the file name "82-3" of the comparative image 82-3 from the file names stored in the display manager 12*a*. Consequently, the only display object left is the image 82-4.

The description will continue using as an example a situation in which the processing proceeds to step S121, and the user compares the reference image 82-2 with the comparative image 82-3, and selects the reference image 82-2. When the reference image 82-2 is selected, the processing proceeds to step S123.

In step S123, the body microcomputer 12 decides that there is an undisplayed image 82-4 on the basis of identification numbers stored in the display manager 12*a*, and the processing proceeds to step S124.

In step S124, the body microcomputer 12 selects the image with the lowest aperture value during imaging as the comparative image, from among the images that are display objects. In this case, since the only display object is the image 82-4, the image 82-4 is selected as the comparative image.

Figure 20A:
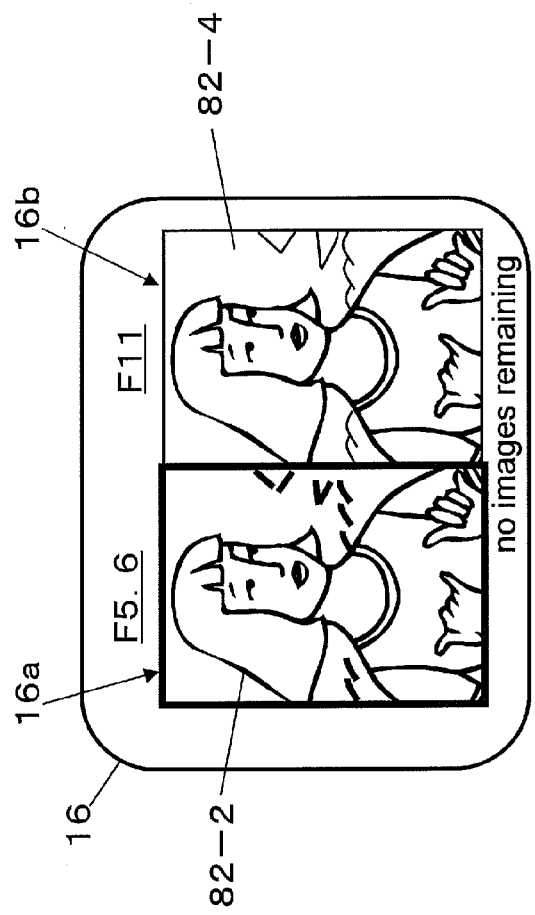
FIGS. 20A and 20B are display examples of the image comparison and selection mode.

In step S125, the body microcomputer 12 notifies the image display controller 15 which of the images were selected as reference image 82-2 or the comparative image 82-4. The image display controller 15 displays the reference image 82-2 on the left half of the liquid crystal monitor 16 (the first display region 16*a*). The image display controller 15 also displays the comparative image 82-4 on the right half of the liquid crystal monitor 16 (the second display region 16*b*) (step S125). A display example of the liquid crystal monitor 16 at this point is shown in FIG. 20A. After this, the processing returns to step S120.

In step S120, the body microcomputer 12 excludes the reference image 82-2 and the comparative image 82-4 from the display objects. More specifically, the body microcomputer 12 deletes the file name "82-4" of the comparative image 82-4 from the file names stored in the display manager 12*a*. As a result, no more file names are stored in the display manager 12*a*, so there are zero display objects.

The description will continue using as an example a situation in which the processing proceeds to step S121, and the user compares the reference image 82-2 with the comparative image 82-4, and selects the reference image 82-2. When the reference image 82-2 is selected, the processing proceeds to step S123.

In step S123, since there are no display objects left, it is decided that there are no images yet to be displayed, and the processing proceeds to step S126.

Figure 20B:
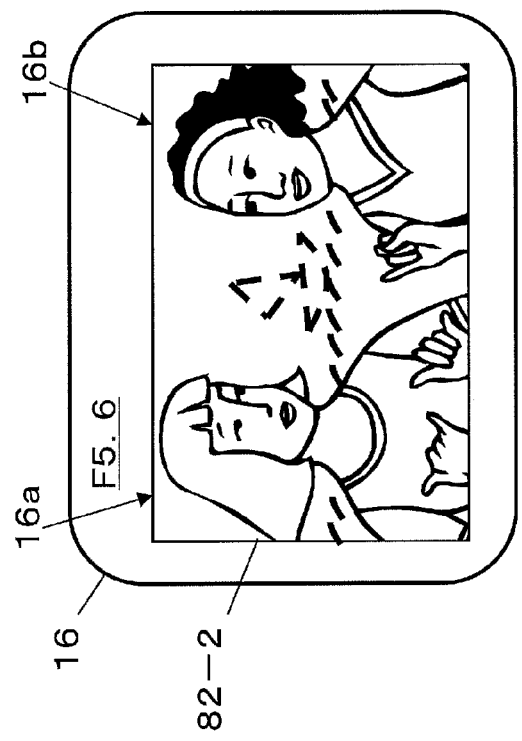

The body microcomputer 12 then confirms the reference image 82-2 as the optimal image (step S126). Finally, the image display controller 15 displays the entire optimal image 82-2 on the liquid crystal monitor 16 (FIG. 20B), and the body microcomputer 12 ends the image comparison and selection mode.

Thus, with the digital camera 200, when one of the images displayed in the first display region 16*a* and the second display region 16*b* is selected between the start and end of the image comparison and selection mode, the image that was not selected is not displayed in the first display region 16*a* or the second display region 16*b* until the end of the image comparison and selection mode. Therefore, there is no need for images not selected to be compared again, and it is possible to efficiently select the optimal image from among three or more images by comparing the images and selecting the better one each time in the above-mentioned image comparison and selection mode.

Also, since only two images (a reference image and a comparative image) are compared on the liquid crystal monitor 16, the display size of the images can be kept relatively large even if the liquid crystal monitor 16 is small, making it easier to compare the images.

Changing the Comparative Image in Enlargement Mode

The above-mentioned enlargement mode is also effective during the image comparison and selection mode. If the enlargement mode button 79 is pressed during the image comparison and selection mode, the camera goes into enlargement display mode. Also, when the image comparison and selection mode button 80 is pressed during enlargement display mode in the comparison reproduction mode, the camera goes into image comparison and selection mode while the enlargement display mode is maintained. For example, if the image comparison and selection mode button 80 is pressed after step S111 (FIG. 15), the display screen of the liquid crystal monitor 16 after step S119 for image comparison and selection mode will be as shown in FIG. 15. Specifically, the same regions of the reference image and comparative image will be displayed enlarged at the same magnification.

After this, when the next reference image and comparative image are displayed in step S125, the display conditions of enlargement mode are maintained. Specifically, the same regions are displayed enlarged at the same magnification for the next reference image and comparative image.

As discussed above, using the enlargement mode in the image comparison and selection mode allows the user to compare enlarged image displays and select the optimal image, making the comparison of images easier.

2.10: Operation in Depth Confirmation Mode

With this digital camera 200, a depth-of-field reviewing mode is further provided so that a plurality of images with different aperture values can be compared side by side prior to imaging in order to decide upon which aperture value to use for imaging.

The body microcomputer 12 of the digital camera 200 decides whether or not the depth-of-field reviewing button 76 (FIG. 5) has been pressed. If the depth-of-field reviewing button 76 has been pressed, the mode changes to a depth-of-field reviewing mode. The depth-of-field reviewing mode will now be described in specific terms.

When the depth-of-field reviewing button 76 is pressed, imaging is continuously performed at different aperture values. More specifically, the operation from the above-mentioned steps S1 to S4 is carried out continuously. The continuously captured images are recorded in the folder 82.

The mode then changes to the comparison reproduction mode. Here, the processing changes to the comparison reproduction mode regardless of whether or not the comparison reproduction mode has been selected with the imaging/reproduction mode switching lever 71. The optimal image is then selected and confirmed by user operation.

More specifically, the operation from the above-mentioned steps S103 to S118 is carried out.

It is also possible to use the above-mentioned image comparison and selection mode to select the optimal image. When the user presses the image comparison and selection mode button 80, the optimal image is selected by image comparison and selection mode. More specifically, the operation of steps S119 to S126 is carried out.

Next, the aperture value is set to be the same as that for the image selected as the optimal image. More specifically, the body microcomputer 12 acquires the aperture value for the image selected as the optimal image from the file 82-100 recorded to the folder 82, and sends this aperture value to the lens microcomputer 20. The lens microcomputer 20 issues a command to the aperture controller 27 to set this aperture value. The aperture controller 27 drives the diaphragm drive motor 28b and sets the aperture to this aperture value.

Then, the camera enters an imaging standby state in manual aperture mode using the set aperture value, and the depth-of-field reviewing mode is ended.

After this, the user can continue imaging at the same aperture value as with the optimal image selected upon comparison of the images in depth-of-field reviewing mode.

3: Features

The digital camera 200 has the following features.

(1) With this digital camera 200, a reference image and a comparative image are displayed side by side on the liquid crystal monitor 16 in comparison reproduction mode and image comparison and selection mode. Consequently, two images captured under different imaging conditions can be easily compared. Also, since the comparative image and reference image can be switched, and the comparative image can be switched with another comparative image, this improves convenience in the comparison of a plurality of images.

(2) In image comparison and selection mode, the display manager 12a manages the images 82-3 and 82-4, which of the plurality of images 82-1 to 82-4 recorded to the recording medium have not yet been displayed on the liquid crystal monitor 16, as display objects (steps S120 and S123, for example). More specifically, the display manager 12a stores as identification information the file names of images that are being managed as display objects, and manages the display objects according to file name. When an image that has already been displayed on the liquid crystal monitor 16 in the same image comparison and selection mode is excluded from the display objects, the display manager 12a deletes the file name of the displayed image from among the stored file names (step S120, for example).

In a state in which the display objects are managed by the display manager 12a as discussed above, the image displayed on the liquid crystal monitor 16 is selected by the selector 12b as the selected image from among the display objects managed by the display manager 12a. The selected image is displayed in the first display region 16a or the second display region 16b under the control of the image display controller 15 (steps S124 and S125, for example).

In the image comparison and selection mode, management of the display objects is carried out by the display manager 12a, so images that have yet to be displayed can be displayed, without the images 82-1 and 82-2 that have already been displayed being displayed again. That is, redundant work in which the same images are compared again can be prevented, which improves efficiency in the comparison of images.

(3) Also, the imaging conditions when an image was acquired are recorded along with the image to the recording medium, and in the image comparison and selection mode, an image is selected from among the display objects on the basis of the imaging conditions (such as the aperture value) by the selector 12b. Consequently, the display order can be optimized according to the imaging conditions.

The term "image" used in this embodiment means a captured image that is to be compared and selected, and does not include images such as icons that display the state of the digital camera 200.

Other Embodiments

The specific constitution of the present invention is not limited to the embodiment given above, and various modifications and changes are possible without departing from the gist of the invention.

Furthermore, in the following description, those components that have substantially the same function as in the above embodiment will be numbered the same and will not be described again in detail.

(A)

In the above embodiment, all display images that were not selected in the image comparison and selection mode are excluded from the display objects, but a function may be provided for reserving images which the user decides may need to be compared again later. A reserve button (an example of a second operation section) that performs a reserving function may be provided as an independent button, or the set button 74, for example, may be set to be a reserve button in the image comparison and selection mode. The reserving function will now be described, using as an example a configuration in which the set button 74 is utilized as the reserve button.

When the image comparison and selection mode is begun, the body microcomputer 12 temporarily assigns the function of a reserve button to the set button 74. That is, when the set button 74 is pressed in image comparison and selection mode, the body microcomputer 12 recognizes the confirmation of a reserved image. When the directional arrow key 73 and set button 74 are used to select an image, the selected image is reset as a display object by the display manager 12a even though the selected image has been displayed on the liquid crystal monitor 16.

Figure 21:
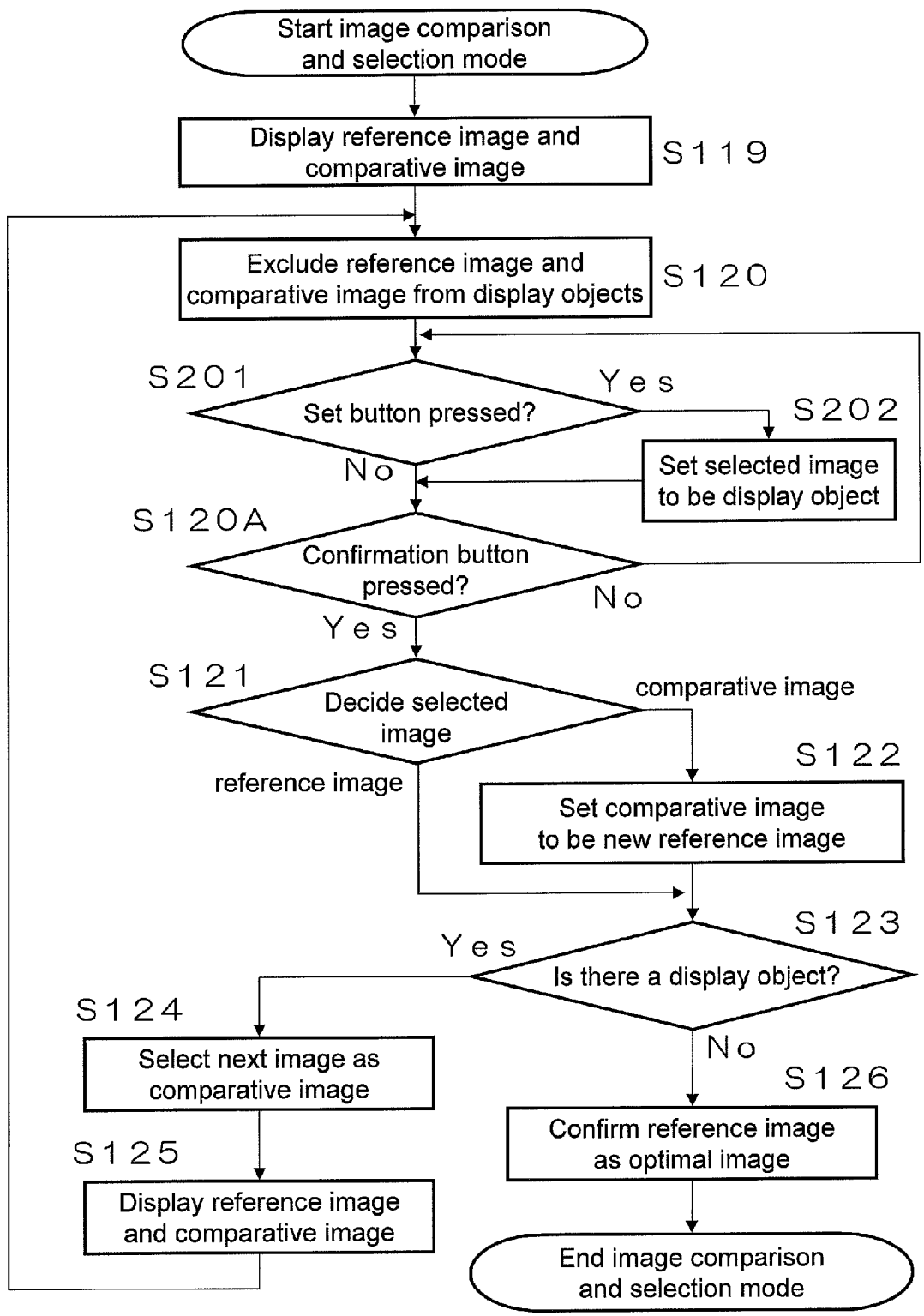
FIG. 21 is a flowchart of the image comparison and selection mode (other embodiment).

More specifically, as shown in FIG. 21, after the reference image and comparative image have been excluded from the display objects in step S120, the body microcomputer 12 monitors the operation of the set button 74 (step S201). When the user moves the cursor box 90 to the first display region 16a or the second display region 16b with the directional arrow key 73, and an image is selected by operation of the set button 74, the display manager 12a sets the selected image to be a display object on the basis of the operation of the set button 74 (step S202). After steps S201 and S202, the processing of steps S120A to S126 of the above embodiment is carried out.

Thus resetting an image that has already been displayed on the liquid crystal monitor 16 and excluded from the display objects to be a display object allows this image to be reserved as a display object, so the reference image and the reserved image can be compared again. That is, accuracy can be increased while minimizing the decrease in efficiency during image comparison.

The information inputted by the set button 74 (that is, information that the set button 74 has been pressed) is an example of second operation information indicating that an image that has been displayed in the first display region 16a or the second display region 16b is reserved as a display object.

Here, the phrase "management of the display objects" can also include the resetting of an image that has already been displayed to being a display object on the basis of some condition, in addition to setting undisplayed images to be display objects, or excluding images that have already been displayed from the display objects.

When step S120, in which the reference image and the comparative image are excluded from the display objects, is executed after steps S201 and S202, the display manager 12a need not set images that have been reserved to be display objects, and the step of excluding reserved images from the display objects may be omitted from the flow.

(B)

In the above embodiment, a single-lens reflex camera was used as an example, but the above-mentioned digital camera is an example of an imaging device and an image display device, and imaging devices and image display devices are not limited to the above embodiment. An image display device may be a digital video camera capable of capturing a plurality of still pictures, or a DVD player that can display images. That is, the imaging device and image display device can be any device as long as it is able to display images.

Also, in the above embodiment, an interchangeable lens type of digital camera having the quick return mirror 4 was described, but the digital camera may be one that has no quick return mirror 4, and in which subject light from the interchangeable lens unit 2 is always guided to the imaging sensor 11 side.

(C)

In the above embodiment, the digital camera 200 is such that when the image displayed in either the first display region 16a or the second display region 16b is selected between the start and end of the image comparison and selection mode, the image that was not selected is not displayed in the first display region 16a or the second display region 16b until the end of the image comparison and selection mode. It is preferable here if an image that was not selected is not automatically deleted from the recording medium so that important images are not deleted if the user should accidentally make the wrong selection.

Also, the configuration may be such that the series of images recorded to the folder 82 are deleted after the end of the depth-of-field reviewing mode.

(D)

In the above embodiment, the selection and setting of the regions to be enlarged are performed by the user, but how the regions to be enlarged are selected is not limited to this. For example, the configuration may be such that a region is detected which includes a large number of boundary regions of different distances to the subject, and the reference frame is set automatically on the basis of detection result. More specifically, for example, the Df amount is detected at a plurality of points in a single image by the focus detection unit 5. The body microcomputer 12 detects, on the basis of this Df amount, a region of greater difference in the Df amount within a single image (a greater difference between the focused region and the unfocused region). The region of greater difference in the Df amount is automatically set as the reference frame.

In this case, since the reference frame is set automatically by the method discussed above, the reference image that is optimal as the standard for comparison can be quickly selected. This further enhances convenience in the comparison of images.

(E)

In the above embodiment, the aperture value is changed by using the aperture ring 40 installed in the interchangeable lens unit 2. However, the configuration may be such that the aperture value can be changed by using a dial, button, or other such operation unit installed in the camera body 1 instead of the aperture ring 40. Also, the operation unit installed in the camera body 1 need not be an operation unit for changing the aperture value, and may instead one that also serves as an operation unit used for another purpose.

(F)

In the above embodiment, the images displayed on the liquid crystal monitor 16 are acquired by the imaging sensor 11. However, another imaging sensor disposed within the viewfinder optical system may be used instead. In this case, in monitor imaging mode there is no need to retract the quick return mirror 4 to outside the optical path X. Also, the configuration and disposition of the quick return mirror 4, the viewfinder optical system 19, and so forth are not limited to those discussed above.

For instance, the configuration may be such that in reproduction mode in which a captured image is reproduced, images captured at different aperture values are displayed side by side on the left and right of the liquid crystal monitor 16. This allows the user to intuitively grasp the relation between aperture values and captured images, and to refer to this when capturing the next image.

(G)

In the above embodiment, the aperture value is changed as an imaging condition, but the imaging conditions are not limited to this. For instance, the images that are compared may be a plurality of images captured at different shutter speeds.

Furthermore, it is conceivable that the aperture value, shutter speed, or other such imaging conditions are not changed in the sequential capture of a plurality of images. Here again, efficiency can be improved during image comparison in image comparison and selection mode.

(H)

When a reference image and a comparative image are displayed side by side, the two images may be displayed with one of them inverted. This makes it easier to compare a plurality of images with different imaging conditions, and the convenience is improved.

(I)

In the above embodiment, a single-lens reflex camera was used as an example of an image display device and an imaging device, but embodiments of the digital camera 200 are not limited to this. For example, this digital camera 200 can also be applied to a compact camera. In particular, when the digital camera 200 is applied to a compact camera having a large imaging element, the position, range, and so forth of the cursor box 90 functioning as the reference frame can be more freely selected, so this image display device and imaging device are more effective.

(J)

In the above embodiment, when the comparative image is selected as the new reference image as in the display example in FIGS. 16A and 16B, the display positions of the comparative image and reference image are switched, and the reference image is displayed on the left side just as before, but it may be decided that the image surrounded by the cursor box 90 is the reference frame, and the display position need not be changed. In this case, when the dial 78 is turned and the comparative image is changed to the other image, the image not surrounded by the cursor box 90 may be changed.

In the above embodiment, the reference image and comparative image are side by side on the left and right, but it is also conceivable that the reference image and comparative image will be displayed one above the other or diagonally aligned. Here again, the same effect as in the above embodiment will be obtained.

(K)

In the above embodiment, two images with different imaging conditions (the reference image and comparative image)

are displayed on the liquid crystal monitor 16, but three or more images with different imaging conditions may be displayed. For instance, when three images are compared, a reference image, a first comparative image, and a second comparative image are displayed on the liquid crystal monitor 16.

(L)

Possible imaging conditions other than the above-mentioned aperture value include the imaging date and time and shutter speed. In the case of the imaging date and time, the selector 12b selects the images starting with the oldest or the newest image, and in the case of the shutter speed, the selector 12b selects the images starting with the fastest or the slowest speed.

(M)

The coordinate axes, directions, component layouts, and so forth used in the above description are not intended to limit the usage state of the image display device and imaging device.

(N)

In the above embodiment, file names are used as identification information when the display manager 12a manages the display objects, but the identification information is not limited to file names. As long as a single image can be specified from among a plurality of images, any other information may be used as the identification information.

(O)

In the above embodiment, a constitution is employed in which the image whose display is to be continued (the image with the better evaluation) is selected from among the reference image and the comparative image, but a constitution may be employed in which the image that is to be switched for another image (the image with the worse evaluation) is selected. In this case, in step S121 in FIG. 18, the new comparative image is set to be the reference image when the reference image is selected, and in step S123 it is confirmed whether there is a display object when the comparative image is selected.

(P)

In the above embodiment, step S120 in which the reference image and comparative image are excluded from the display objects, is executed after step S125 in which the reference image and the comparative image are displayed, but as long as step S120 in which the images are excluded from the display objects comes before step S123 in which it is confirmed whether there is a display object, and comes before step S122 in which the comparative image is set to be the new reference image, some other processing order may be used. For example, step S120 may be executed after step S120A, S121, or S122.

In the above embodiment, the reference image and comparative image set by the setting section 12c are excluded from the display objects, but an image selected as the comparative image from among the display objects in step S124 (an example of the selected image) may be excluded from the display objects by the display manager 12a. In this case, the timing at which the image selected as the comparative image from among the display objects is excluded from the display objects can be any timing, as long as the timing for excluding the selected image is within the period from the timing of step S124 in which the selector 12b selects the comparative image to the timing of step S123.

It is also conceivable that the display manager 12a will utilize first operation information to manage the display objects. More specifically, the image not selected in step S120A may be excluded from the display objects. The "first operation information" here is information inputted with the directional arrow key 73 and the confirmation button 77, and is information for selecting the image displayed in either the first display region 16a or the second display region 16b (or for selecting either the first display region 16a or the second display region 16b). In this case, the display manager 12a excludes from the display objects the image not selected from among the two images displayed in the first display region 16a and the second display region 16b (the other image). More precisely, the file name of the image not selected is deleted from the storage region by the display manager 12a.

The timing at which the image not selected in step S120A is excluded from the display objects can be any timing, as long as the timing for excluding the selected image is within the period from the timing of step S120A to the timing of step S123.

(Q)

Up until the selected image selected by the selector 12b is displayed on the liquid crystal monitor 16 in step S125, it is treated as an image to be displayed. For example, after the selected image has been selected by the selector 12b in step S124, if that selected image is excluded from the display objects by the display manager 12a, then the image to be displayed is excluded from the display objects even though it has yet to be displayed.

(R)

An embodiment was described in which the image comparison and selection mode was used as an example of the "specific mode," but the specific mode is not limited to the above-mentioned mode. For instance, as long as it is a mode in which redundant comparison work can be effectively eliminated, the above-mentioned technique is applicable.

INDUSTRIAL APPLICABILITY

With the image display device and imaging device described above, it is possible to provide an image display device and imaging device with which efficiency can be improved in the comparison of images. Accordingly, the image display device and imaging device described above are useful in the field of devices that display images.

The invention claimed is:

1. An image display device comprising:
a recorder configured to record a plurality of images;
a display unit having a first display region and a second display region, the display unit being configured to display images recorded by the recorder;
a display manager configured to manage as a display object at least one image that has yet to be displayed on the display unit in a specific mode, out of the plurality of images recorded to the recorder;
a selector configured to select an image to be displayed as a selected image on the display unit from the display object;
an image display controller configured to display the selected image in the first display region or the second display region; and
a setting section configured to set two of the plurality of images recorded to the recorder to be a reference image and a comparative image that are displayed in the first display region and the second display region;
wherein the display manager is configured to exclude from the display object the reference image and the comparative image set by the setting section.

2. The image display device according to claim 1, wherein the display manager is configured to exclude from the display object any images that are being displayed in the first display region or the second display region, or that are scheduled to be displayed.

3. The image display device according to claim 2, wherein the display manager is configured to exclude the selected image from the display object.

4. The image display device according to claim 2, wherein the display manager is configured to store identification information for images managed as the display object.

5. The image display device according to claim 2, wherein the recorder is configured to record the imaging conditions when the images are acquired along with the images, and the selector is configured to select the selected image from the display object on the basis of the imaging conditions.

6. The image display device according to claim 2, further comprising
a second operation section configured to receive input of second operation information for selecting an image displayed in the first display region or the second display region, and
the display manager is configured to reserve the image selected using the second operation information as the display object.

7. The image display controller according to claim 1, further comprising
a first operation section configured to receive input of first operation information for selecting one of the two images displayed in the first display region and the second display region, wherein,
when the first operation information is information for selecting the reference image, the setting section sets the selected image to be the comparative image, and
when the first operation information is information for selecting the comparative image, the setting section resets the image set as the comparative image to be the reference image, and sets the selected image to be the comparative image.

8. The image display device according to claim 7, wherein the display manager is configured to store identification information for images managed as the display object.

9. The image display device according to claim 1, wherein the display manager is configured to store identification information for images managed as the display object.

10. The image display device according to claim 1, wherein the recorder is configured to record the imaging conditions when the images are acquired along with the images, and the selector is configured to select the selected image from the display object on the basis of the imaging conditions.

11. The image display device according to claim 1, further comprising
a second operation section configured to receive input of second operation information for selecting an image displayed in the first display region or the second display region, wherein
the display manager is configured to reserve the image selected using the second operation information as the display object.

12. An imaging device comprising:
an optical system configured to form an optical image of a subject;
an image acquisition section configured to convert the optical image into an image signal and configured to acquire an image of the subject; and
the image display device according to claim 1, the image display device being configured to display the image acquired by the image acquisition section.

13. An image display device comprising:
a recorder configured to record a plurality of images;
a display unit having a first display region and a second display region, the display unit being configured to display images recorded by the recorder;
a display manager configured to manage as a display object at least one image that has yet to be displayed on the display unit in a specific mode, out of the plurality of images recorded to the recorder;
a selector configured to select an image to be displayed as a selected image on the display unit from the display object;
an image display controller configured to display the selected image in the first display region or the second display region; and
a first operation section configured to receive input of first operation information for selecting one of the two images displayed in the first display region and the second display region,
wherein the display manager is configured to utilize the first operation information to manage the display object, and
when the first operation information is information for selecting one of the two images displayed in the first display region and the second display region, the display manager excludes from the display object the other of the two images displayed in the first display region and the second display region.

14. An image display device comprising:
a recorder configured to record a plurality of images;
a display unit having a first display region and a second display region, the display unit being configured to display images recorded by the recorder;
a display manager configured to manage as a display object at least one image that has yet to be displayed on the display unit in a specific mode, out of the plurality of images recorded to the recorder;
a selector configured to select an image to be displayed as a selected image on the display unit from the display object;
an image display controller configured to display the selected image in the first display region or the second display region; and
a first operation section configured to receive input of first operation information for selecting one of the two images displayed in the first display region and the second display region,
wherein the display manager is configured to exclude from the display object any images that are being displayed in the first display region or the second display region, or that are scheduled to be displayed,
the display manager is further configured to utilize the first operation information to manage the display object, and
when the first operation information is information for selecting one of the two images displayed in the first display region and the second display region, the display manager excludes from the display object the other of the two images displayed in the first display region and the second display region.

* * * * *